US006898333B1

(12) United States Patent
Gopalakrishnan et al.

(10) Patent No.: US 6,898,333 B1
(45) Date of Patent: May 24, 2005

(54) METHODS AND APPARATUS FOR DETERMINING THE ORIENTATION OF AN OBJECT IN AN IMAGE

(75) Inventors: Venkat Gopalakrishnan, Natick, MA (US); Albert Montillo, Philadelphia, PA (US); Ivan Bachelder, Newton, MA (US)

(73) Assignee: Cognex Corporation, Natick, MA (US)

( * ) Notice: Subject to any disclaimer, the term of this patent is extended or adjusted under 35 U.S.C. 154(b) by 810 days.

(21) Appl. No.: 09/629,245

(22) Filed: Jul. 31, 2000

Related U.S. Application Data

(60) Provisional application No. 60/147,721, filed on Aug. 6, 1999.

(51) Int. Cl.⁷ ................................................ G06K 9/36
(52) U.S. Cl. ...................... 382/289; 382/141; 382/191; 382/291; 358/1.5; 358/488
(58) Field of Search ................................ 382/103, 141, 382/145, 147, 151, 274, 289, 291, 191, 190, 209, 216, 217–219, 250, 252, 260, 275, 278, 280, 282, 295, 146; 358/1.5, 496, 497, 488, 447, 448, 452, 453, 463

(56) References Cited

U.S. PATENT DOCUMENTS

| 4,164,788 A | * | 8/1979 | Jain | 364/515 |
|---|---|---|---|---|
| 4,700,236 A | * | 10/1987 | Abe | 358/284 |
| 4,791,586 A | * | 12/1988 | Maeda et al. | 716/5 |
| 4,843,631 A | | 6/1989 | Steinpichler et al. | |
| 4,845,764 A | | 7/1989 | Ueda et al. | |
| 4,912,336 A | * | 3/1990 | Nayar et al. | 250/559.17 |
| 4,913,549 A | * | 4/1990 | Fujita et al. | 356/521 |
| 4,978,224 A | * | 12/1990 | Kishimoto et al. | 356/394 |
| 4,980,971 A | | 1/1991 | Bartschat et al. | |

(Continued)

OTHER PUBLICATIONS

Cognex Corporation, Cognex 3000/4000/5000 Vision Tool, Revision 7.6, Chapter 4, Caliper Tool, 1996.

Cognex Corporation, Cognex 3000/4000/5000 Vision Tool, Revision 7.6, Chapter 5, Inspection, 1996.

Cognex Corporation, Cognex 4000/5000 SMD Placement Guidance Package, User's Manual Release 3.8.00, Chapter 7, Rectilinear Device Inspection, 1998.

*Primary Examiner*—Bhavesh M. Mehta
*Assistant Examiner*—Yosef Kassa
(74) *Attorney, Agent, or Firm*—Tracy Calabresi

(57) ABSTRACT

A method and an apparatus are disclosed for finding an orientation of an object from the image of the object through the generation of, and subsequent evaluation of, at least a portion of a frequency response of the image. The orientation of the object can be used in subsequent image processing.

53 Claims, 15 Drawing Sheets

U.S. PATENT DOCUMENTS

| | | | |
|---|---|---|---|
| 5,023,916 A | | 6/1991 | Breu |
| 5,055,665 A | * | 10/1991 | Baba et al. ............... 250/201.7 |
| 5,060,276 A | | 10/1991 | Morris et al. |
| 5,075,619 A | * | 12/1991 | Said ........................ 324/76.31 |
| 5,113,565 A | | 5/1992 | Cipolla et al. |
| 5,151,822 A | | 9/1992 | Hekker et al. |
| 5,164,994 A | | 11/1992 | Bushroe |
| 5,226,095 A | | 7/1993 | Okumura et al. |
| 5,257,714 A | * | 11/1993 | Beers et al. ................. 228/6.2 |
| 5,268,999 A | | 12/1993 | Yokoyama |
| 5,343,028 A | | 8/1994 | Figarella et al. |
| 5,371,690 A | | 12/1994 | Engel et al. |
| 5,440,391 A | * | 8/1995 | Smeyers et al. ............ 356/615 |
| 5,471,541 A | | 11/1995 | Burtnyk et al. |
| 5,495,537 A | | 2/1996 | Bedrosian et al. |
| 5,497,451 A | | 3/1996 | Holmes |
| 5,500,906 A | | 3/1996 | Picard et al. |
| 5,539,518 A | * | 7/1996 | Bennett ...................... 356/452 |
| 5,545,887 A | | 8/1996 | Smith et al. |
| 5,602,937 A | | 2/1997 | Bedrosian et al. |
| 5,621,807 A | | 4/1997 | Eibert et al. |
| 5,625,715 A | | 4/1997 | Trew et al. |
| 5,627,912 A | | 5/1997 | Matsumoto |
| 5,627,915 A | | 5/1997 | Rosser et al. |
| 5,663,809 A | | 9/1997 | Miyaza et al. |
| 5,694,482 A | | 12/1997 | Maali et al. |
| 5,822,043 A | * | 10/1998 | Ebinuma ...................... 355/55 |
| 5,828,769 A | | 10/1998 | Burns |
| 5,850,469 A | | 12/1998 | Martin et al. |
| 5,974,169 A | | 10/1999 | Bachelder |
| 6,061,587 A | * | 5/2000 | Kucharczyk et al. ........ 600/411 |
| 6,067,379 A | * | 5/2000 | Silver .......................... 382/216 |
| 6,137,896 A | * | 10/2000 | Chang et al. ............... 382/118 |
| 6,307,951 B1 | | 10/2001 | Tanigawa et al. |
| 6,508,767 B2 | * | 1/2003 | Burns et al. ................. 600/443 |
| 6,556,704 B1 | | 4/2003 | Chen |

OTHER PUBLICATIONS

Cognex Corporation, Cognex 4000/5000 SMD Placement Guidance Package, User's Manual Release 3.8.00, Chapter 8, Large–Leaded Device Inspection, 1998.

Cognex Corporation, Cognex 4000/5000 SMD Placement Guidance Package, User's Manual Release 3.8.00, Chapter 15, MFOV–LL Device Inspection, 1998.

Cognex Corporation, Cognex 3000/4000 SMD Tools Release 5.2, SMD 2, 1994.

Timothy S. Newman, Anil K. Jain and H.R. Keshavan, 3D CAD–Based Inspection I: Coarse Verification, pp. 49–52, IEEE, 1992.

Anthony Hoogs and Ruzena Bajcsy, Model–based Learning of Segmentations, pp. 494–499, IEEE, 1996.

Shimon Ullman, Aligning pictorial descriptions: An approach to object recognition, COGNITION, vol. 32, No. 3, pp. 193–254, Aug. 1989.

Cognex Corporation, Cognex MVS–8000 Series, GDE User's Guide, Revision 1.1, Apr. 7, 2000.

Jae S. Lim, Two–Dimensional Signal and Image Processing, Prentice Hall P T R, Englewood Cliffs, New Jersey, 1990.

The MathWorks, Inc. Radon (Image Processing Toolbox); http://www.mathworks.com/access/helpdesk/hel/toolbox/images/radon/shtml.

The MathWorks, Inc., Iradon (Image Processing Toolbox); http:/www.mathworks.com/access/helpdesk/hel/toolbox/images/radon/shtml.

* cited by examiner

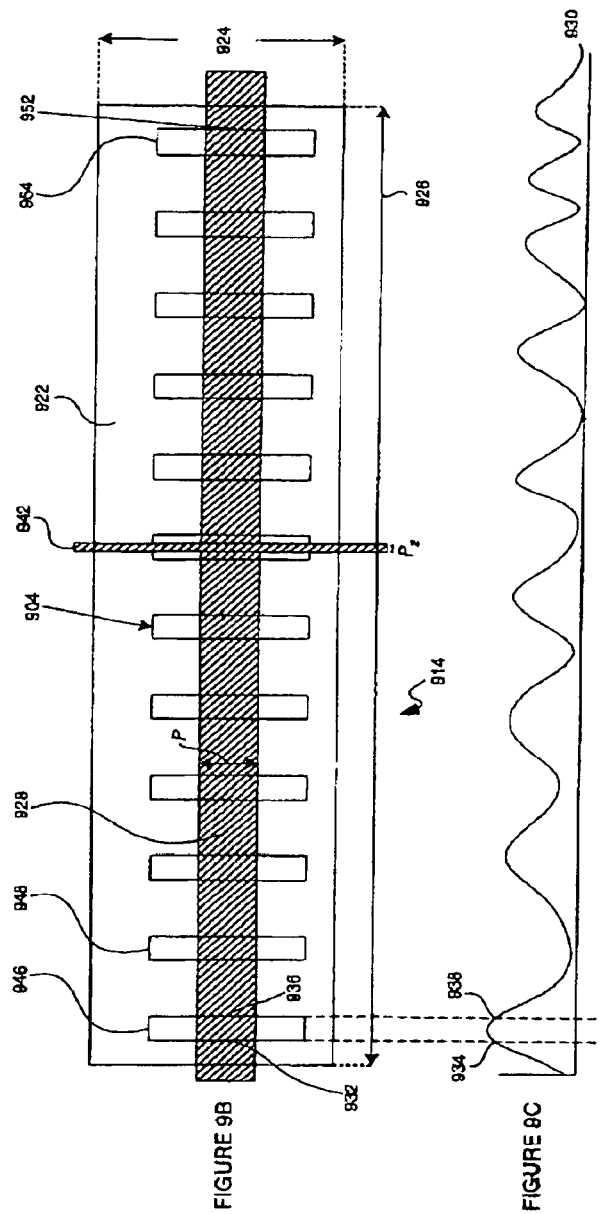
FIGURE 9B
FIGURE 9C
FIGURE 9D

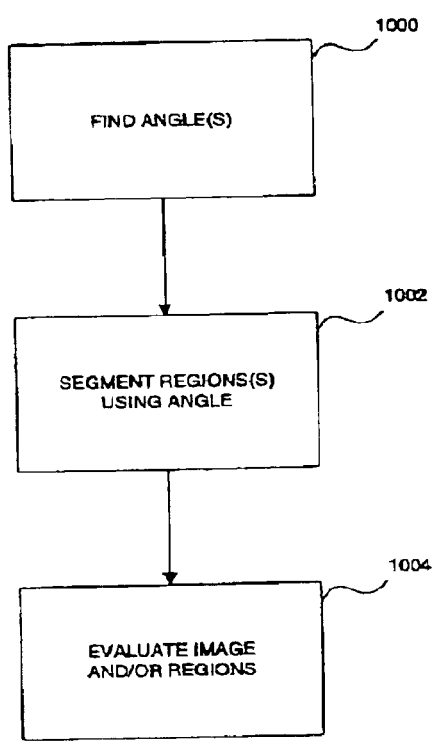
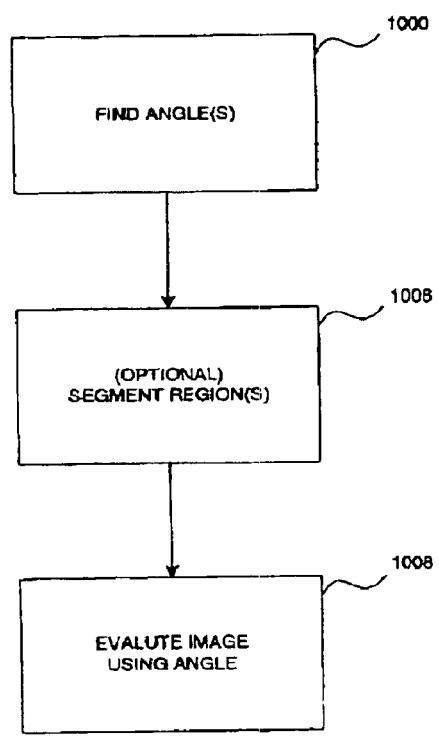
FIGURE 10A
FIGURE 10B

METHODS AND APPARATUS FOR DETERMINING THE ORIENTATION OF AN OBJECT IN AN IMAGE

This application claims the benefit of U.S. Provisional Application No. 60/147,721, filed Aug. 6, 1999.

FIELD OF THE INVENTION

This invention relates to machine vision, and particularly to methods and apparatuses for processing images.

BACKGROUND

Machine vision refers to the automated analysis of an image to determine characteristics of objects and other features shown therein. It is often employed in automated manufacturing lines, where images of components are analyzed to determine placement and alignment before assembly. Machine vision is also used for quality assurance. For example, in the pharmaceutical and food packing industries, images of packages are analyzed to insure that product labels, lot numbers, "freshness" dates, and the like, are properly positioned and legible.

In many machine vision applications, it is essential to in determining the position and orientation of an imaged object. In electronic circuit board assembly, for example, integrated circuit chips must be precisely positioned before they can be soldered into place. Metallic solder pads feature predominantly in images of these components and, as such, are often used in determining chip location and orientation. For example, a vision-based automatic surface mounter (SMD) machine typically employs a geometrical-based model of leaded objects to accurately inspect and place leaded objects on a printed circuit board (PCB). A leaded object 900 is an electronic component that has an object body 902 and leads 904, an example of which is depicted in FIG. 9, which is discussed more fully with reference to FIG. 8 hereinafter. The SMD machine places the leaded objects by registering the leaded object 900 with pads on the PCB, such that the centers of feet 906 of the leaded object 900 align with the centers of pads on the PCB within positional tolerances.

Objects whose image is to be analyzed by machine vision typically include calibration targets. Often a cross-shaped symbol or parallel array of dots, such a target facilitates determining the position and orientation of the object in the image.

If the object is composed of lines, such as the calibration target, there are several known approaches to the problem of finding the angle of a line in an image. One of the best known techniques is the Hough line-transform. The Hough line-transform transforms characteristics of edge points from image into line characteristics, and represents the line characteristics on a Hough space, where a point in the Hough space represents a line. Though often used, the Hough transform can require significant computation resources and time. Another technique to find lines is described in Machine Vision Method for Identifying Collinear sets of Points from an Image, U.S. Pat. No. 6,075,881. The '881 patent employs an angle-finding phase and a line-finding phase to find the lines. During the angle-finding phase, the angular orientation of a predominant line is estimated by projecting data points at multiple angles, (i.e., summed in the direction of the projection, where projection is a term known in the art and described at B. K. D. Horn, "Robot Vision," MIT Press, London England, 1985, Section 3.3 pp. 53–57). An angle of the predominant line is used by the line finding-phase to find lines by identifying sets of data points aligned with the angle. The line finding phase projects the data points at the angle, and the lines are located at peaks in the projections, as is further described in the '881 patent. Both of these methods, however, are directed at finding lines, and may not work in all applications, such as for short lines or noisy images, for example. Short lines are difficult to identify because not enough edges accumulate in a Hough bin or not enough data points cluster in the projection, for example. Further, it is difficult to identify lines from noisy images containing the lines, such as images of specularly reflecting leads, where specularity is known in the at and is described further hereinafter. The noise masks the lines, thus, making it difficult to identify the lines amidst a noisy Hough space or a noisy projection, for example.

Another known method uses the angle of strong edge features to determine the orientation. Typically, edge detection is performed on the image, and the results are stored in an edge image. The edges within the edge image are projected at various angles, such as through a Radon transform, for example. Peaks in the Radon transform indicate the possible presence of lines that correspond to the angles of the image or objects in the image that have prominent edge patterns. Angles of images and some objects can be determined from projecting edges, but the method is also susceptible to be misled by stray edges and noise.

SUMMARY

This invention provides methods and apparatuses for determining an orientation of an object from an image of the object. First, a two-dimensional frequency response of the image, or portion thereof, is determined, and, preferably, represented in a frequency space, such as a two-dimensional plot or a frequency image, for example. Second, the frequency space is evaluated to determine an orientation of a spatial-frequency pattern therein. The invention recognizes, among other things, that the orientation of the spatial-frequency pattern within the frequency space is related to the orientation of the object in the image. More generally, the invention recognizes the frequency response of an image, or portion thereof, contains information about the orientation of objects in the image.

In a preferred embodiment, the invention recognizes that a magnitude of a frequency response of an image, or portion thereof, contains a spatial-frequency pattern or patterns, and that the orientation of the spatial-frequency pattern or patterns is related to, and often the equivalent of, the orientation of the object in the image.

Further, the invention recognizes that once the frequency response, or portion thereof, is represented two dimensionally in a frequency space, whether plotted or within a frequency image, for example, and the frequency response, or portion thereof is preferably scaled to enhance the high frequencies, the orientation information is easily obtained from the frequency space using a variety of algorithms.

In one embodiment, the frequency response, or portion thereof, is scaled using a logarithm scaling function.

In a preferred embodiment, the frequency response, or portion thereof, determined is a magnitude of a two-dimensional discrete fast Fourier transform ("2-D FFT"). The spatial-frequency pattern or patterns formed in the frequency space from the scaled magnitude of the 2-D FFT include a line, lines, and/or at least one set of substantially parallel lines. An angle of the line, denoted line angle, substantially equals, or is at a constant offset from the angle of the object in the image, where the line angle can include the angle of features on an object and/or the angle of the object itself.

The orientation of the object is optionally used in subsequent image processing, such as searching, gauging, inspecting, and, in a preferred embodiment, modeling the features of object in the image.

One of the advantages of the invention is that it is efficient in time. A further advantage is that the invention can robustly determine the angle of an object from an image, regardless of extraneous features in the image, such as artifacts and noise, for example, when the object produces a high frequency response. The extraneous features do not mask the frequency response, and therefore, do not interfere with identification of the angle of the object. Further, the invention is more robust than other methods that cannot distinguish extraneous features juxtaposed and/or surrounding the object, such as projections, for example.

In further aspects, the invention presents methods and apparatuses to determine models, gauge, inspect, or locate features in images.

In further aspects, the invention provides an apparatus in accord with the methods described above. The aforementioned and other aspects of the invention are evident in the drawings and in the description that follows.

BRIEF DESCRIPTION OF DRAWINGS

The invention will be more fully understood from the following detailed description, in conjunction with the accompanying figures, wherein:

FIGS. 9, 9A, 9B, 9C, and 9D depict a leaded object, not drawn to scale, an image of the leaded object, an image of a portion of a lead set the leaded object, a histogram representing edges of the lead set, and a portion of an edge list derived from the histogram, respectively, where the leaded object and be modeled in whole, or in part, using the invention;

FIGS. 10A and 10B are flowcharts summarizing operation of an embodiment of a method according to the invention that uses the angle of at least one feature in an image to evaluate the image.

DETAILED DESCRIPTION OF DRAWINGS

The methods and apparatuses determine the orientation of at least one feature in an image. The method is particularly useful for locating the angle of a lead set of a leaded object, which, optionally, is then used in further aspects to generate a geometric model of the lead set and, optionally, the leaded object. Though this is the form of a preferred embodiment, this embodiment should be considered illustrative, and not restrictive.

Figure 1:
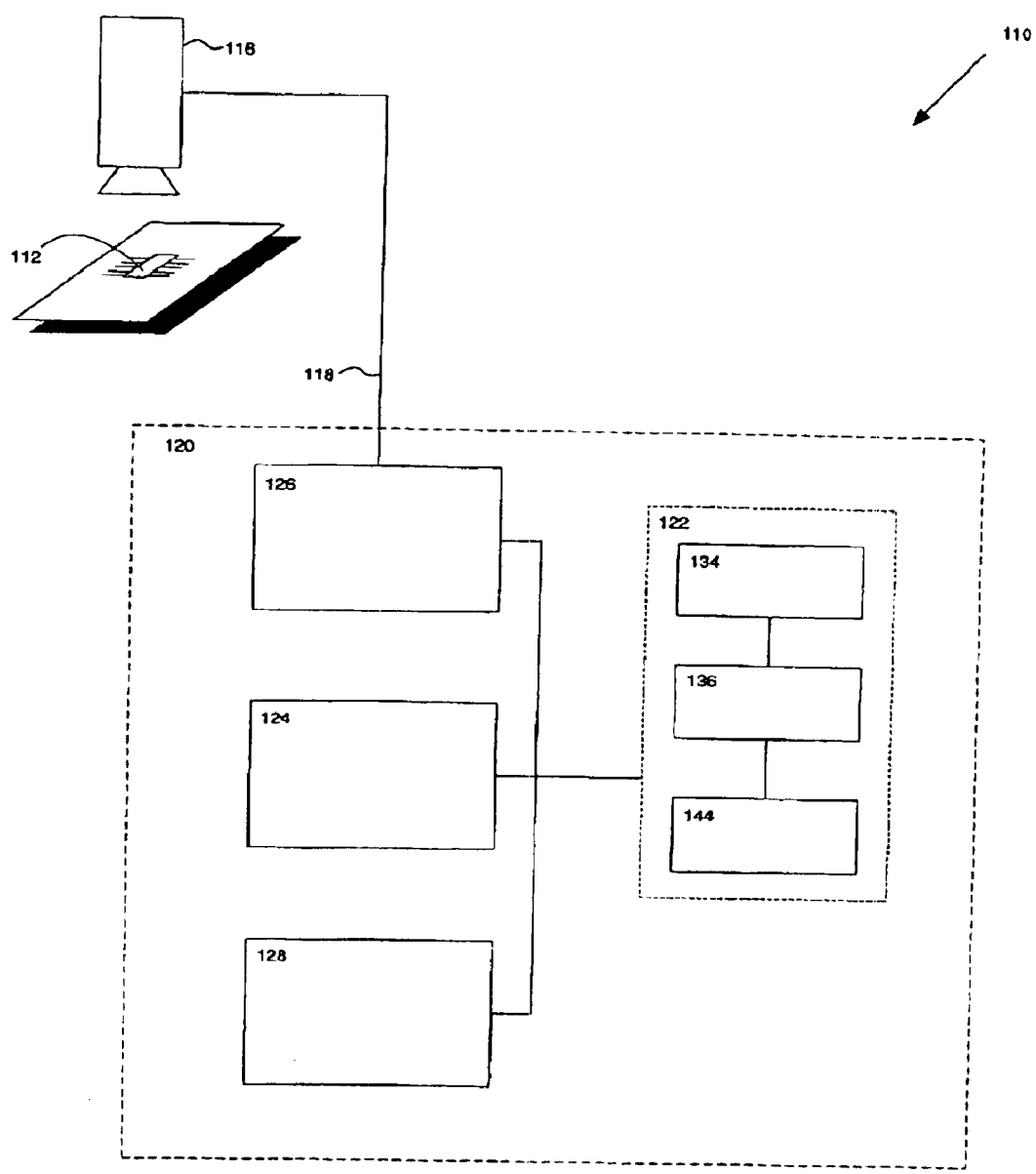
FIG. 1 depicts a schematic machine vision system for practice of the invention.

FIG. 1 illustrates a machine system 110 of the type in which the invention is practiced. The system 110 includes a capturing device 116, such as a conventional video camera or scanner, that generates an image of an object 112. Image data (or pixels) generated by the capturing device 116 represent, in the conventional manner, the image intensity (e.g. color or brightness) of each point in the scene at the resolution of the capturing device 116.

The capturing device 116 transmits image data via a communications path 118 to an image analysis system 120. This is a conventional digital data processor, or a vision processing system of the type commercially available, for example, from the assignee hereof, Cognex Corporation, programmed in accord with the teachings hereof to determine the angle of an object and/or feature in an image from the image data, and, optionally, generate a geometric model of the object and/or feature 112.

The image analysis system 120 may have one or more central processing units 122, main memory 124, an input-output system 126, and one or more disk drives (or other mass storage device) 128, all of the conventional type.

The system 120 and, more particularly, central processing unit 122, is configured by programming instructions according to the teaching hereof to provide the angle of the object and/or features in an image from the image data. The central processing unit 122 includes a frequency device 134, an orientation device 136, and, optionally, an image evaluation device 144. The frequency device 134 and the orientation device 136 generate a frequency response of an image, or portion thereof, and evaluate an angle of a spatial pattern(s), also called spatial-frequency pattern(s), present therein to provide the angle of the object and/or features in the image from the image data, as described hereinafter. The angle is optionally input into the image evaluation device 144, and used therein during subsequent image processing, such as searching, gauging, inspecting, and/or modeling of the object and/or features in the image, for example.

It should be apparent to one skilled in the art that devices within the central processing unit 122 can be partitioned in more than one manner without departing from the scope of the invention.

Those skilled in the art will appreciate that, in addition to implementation on a programmable digital data processor, the methods and apparatuses taught herein can be implemented in special purpose hardware.

Figure 2:
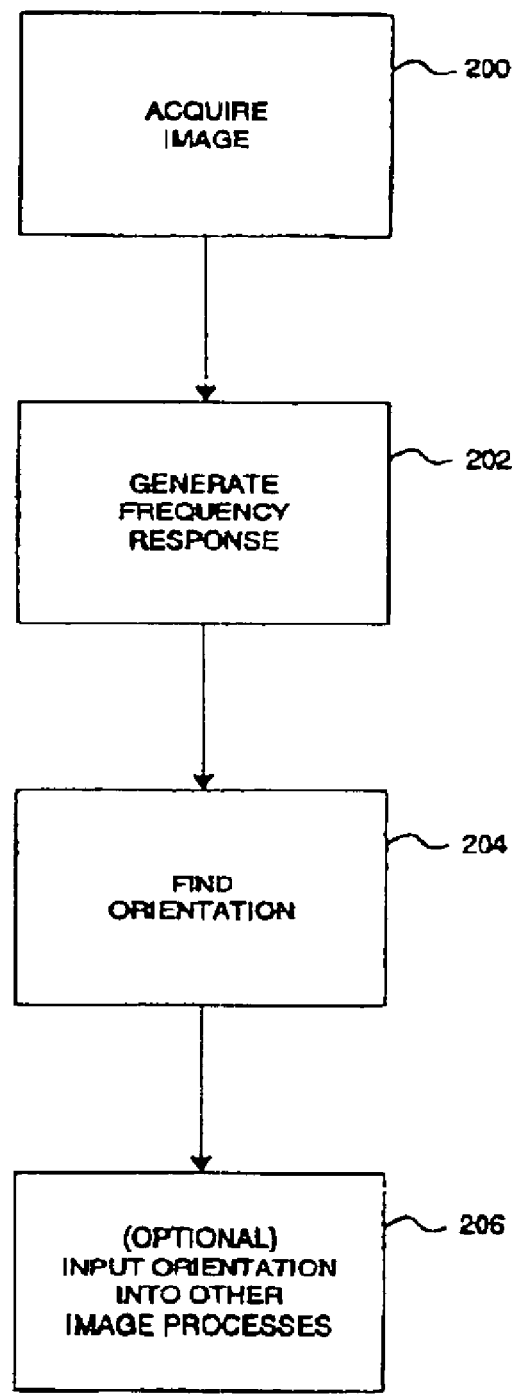
FIG. 2 is a flowchart summarizing operation of an embodiment of a method according to the invention that determines the angle of at least one object and/or feature in an image.

FIG. 2 illustrates a flowchart of an embodiment of a method according to the invention, where steps of the method will be denoted in the detailed description in parentheses. The first step is to acquire an image of the object (200). Next, a frequency response of the image, or portion thereof, is generated (202). Thereafter, the frequency response, or portion thereof, is analyzed to determine the angle of an object and/or features in the image (204).

The frequency response is analyzed because, as recognized by the invention, the frequency response, or portion thereof, contains information about the orientation of objects in the image. More specifically, the invention recognizes that the frequency response, or portion thereof, contains a spatial pattern or patterns that is, or are, related to, and often the equivalent of, the angle of the object in the image.

Figure 3:
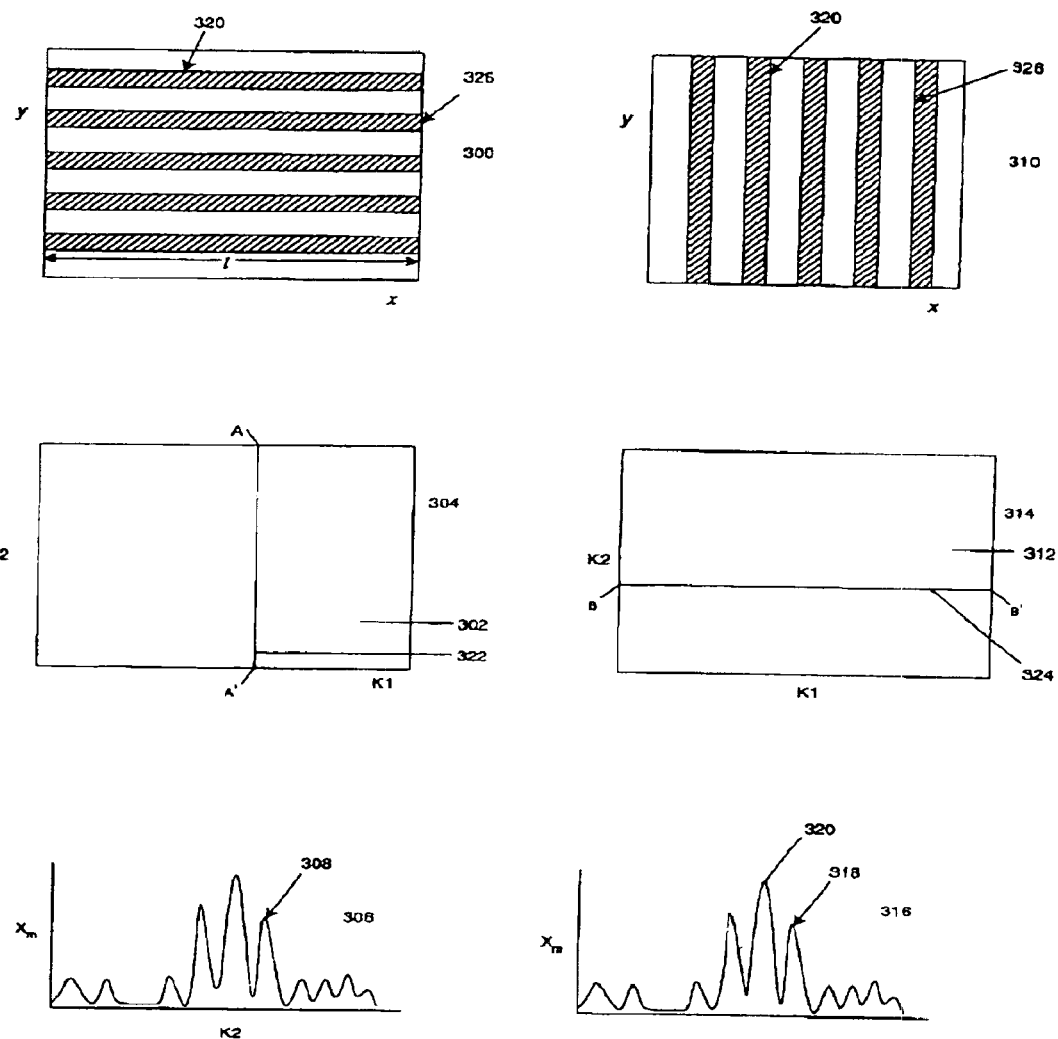
FIG. 3 depicts the operation of applying a frequency analysis of FIG. 2 to two synthetically generated images.

Examples of specific frequency responses of images 300 and 310 of synthetically generated striped objects, herein after termed idealized object 320 are shown in FIG. 3, where the specific frequency responses 302 and 312, are a magnitude of the two-dimensional discrete Fourier transform ("2-D DFT") of the images 300 and 310. The frequency responses 302 and 312 are represented on a dual-axis frequency space 304 and 314, respectively.

The 2-D DFT is given by the following equations.

$$X(k_1, k_2) = \sum_{n_1=0}^{(N_1-1)} \sum_{n_2=0}^{(N_2-1)} x(n_1, n_2) e^{-j(2\pi/N_1)k_1 n_1} e^{-j(2\pi/N_2)k_2 n_2}$$

for $0 \leq k_1 \leq N_1-1$ and $0 \leq k_2 \leq N_2-1$ $X(k_1,k_2)=0$ for all other $k_1$ and $k_2$.

$X(k_1,k_2)$ is the frequency response of the image, $k_1$ and $k_2$ are integers, and $X(k_1,k_2)$, at each $k_1$ and $k_2$, is the value of the frequency response in a frequency space having K1 and K2 as frequency axes. The image is a discrete, two-dimensional function, given by $x(n_1,n_2)$, where $n_1$ and $n_2$ are integers, and the value of $x(n_1,n_2)$ at each point (i.e., each $n_1$ and $n_2$) represents a shade of grey in the image. The image size is $N_1$ by $N_2$, where $N_1$ and $N_2$ are positive integers. The image has an y-axis and an x-axis.

The Fourier frequency analysis represents an image, $x(n_1, n_2)$, of size $N_1$ by $N_2$, (i.e., an $N_1 \times N_2$ point sequence), in the frequency domain by $X(k_1,k_2)$, which is an $N_1 \times N_2$ point sequence.

Returning to FIG. 3, image 300, depicts the idealized striped object 320 positioned in the image 300 so that the dark stripes 326 extend horizontally across the image 300. At a single y-value, the image 300 does not change grey level along the x-axis. The frequency response, $X(k_1,k_2)$, 302, shown on the frequency space 304, reflects the lack of change in grey level of the striped object 320 along the x-axis. The x-axis of the image 300 contributes only to the DC component of the frequency response. Thus, frequencies are only present at the DC component along the K1-axis, specifically frequencies are present where $k_1$=the DC component. Frequencies exist along the $K_2$-axis and are shown in plot 306, which is a cross-section of the frequency space 304 at AA'. The plot 306 depicts the value of the frequency along the abscissa and the magnitude of the frequency, $X_M$, along the ordinate.

As known in the art, $X(k_1,k_2)$ is often complex and is expressed by a magnitude component, $X_M$, and a phase component, $\theta_\pi$, or a real component, $X_r$, and a complex component, $X_I$.

In a preferred embodiment, the frequency response of the image that is generated is the magnitude, $X_M$, where $X_M=|X(k_1,k_2)|=\mathrm{sqrt}(X_r^2+X_i^2)$. $X_M$ is a measure of the strength of the spatial frequencies present in the image, and the strength is represented by the height of the peaks 308 in the plot 306, and is also represented by the brightness or darkness of the features in the frequency images described hereinafter. Peaks, as used herein, exhibit higher magnitudes of frequencies relative to the background level.

In contrast to image 300, image 310 depicts the same idealized striped object 320 positioned differently, so that the dark stripes 326 extend vertically across the image 310. At a single x-value, the image 310 does not change grey level along the y-axis. Accordingly, the frequency response, $X(k_1, k_2)$, 312 is only present at one point along the K2-axis, specifically, frequencies are present where $k_2$=the DC component, while multiple frequencies exists along the K1-axis and are shown in plot 316, which is a cross-section of the frequency space 314 at BB'. The plot 316 depicts the value of the frequency along the abscissa and the magnitude of the frequency, $X_M$, along the ordinate.

Figure 4:
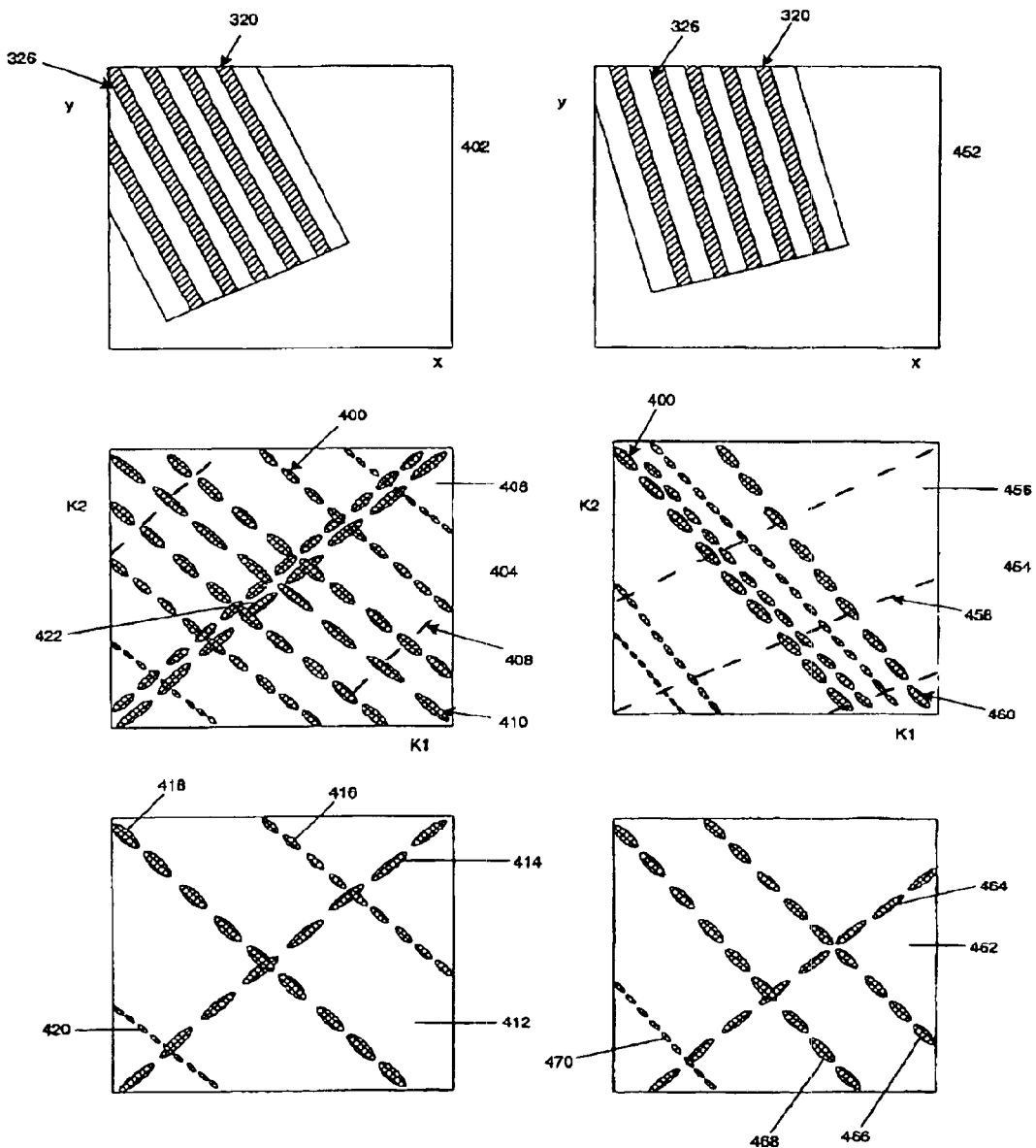
FIG. 4 depicts the operation of FIG. 2 applied to two synthetically generated images.
Figure 4:
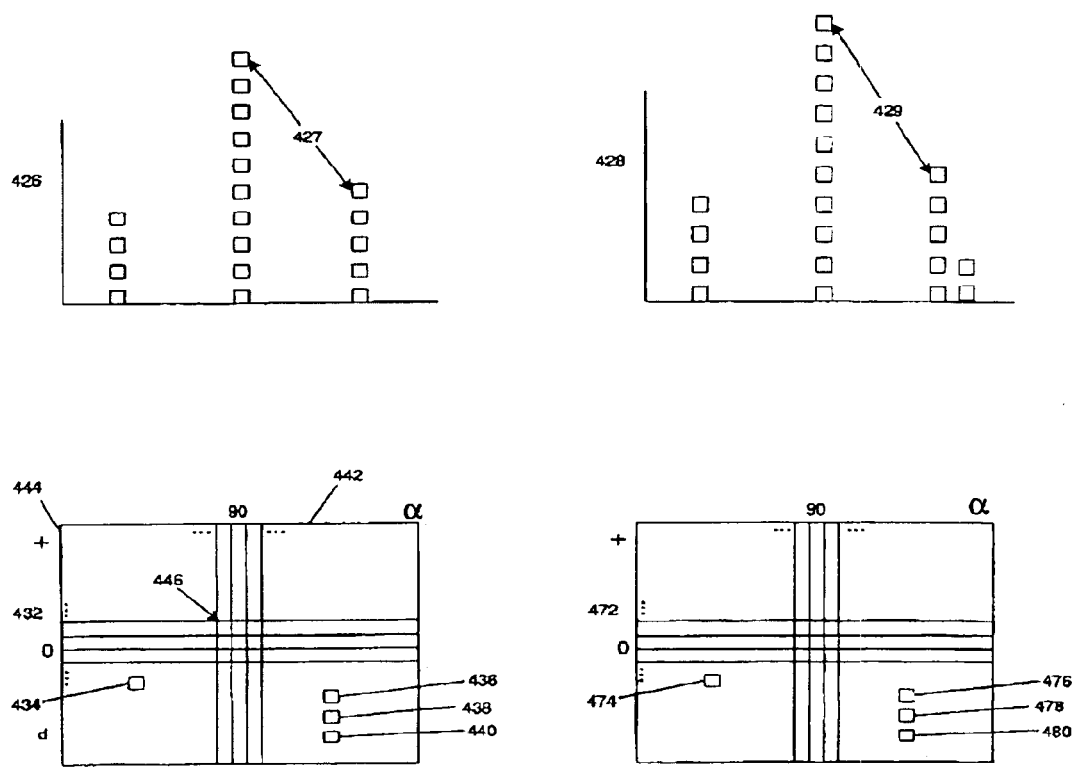

FIG. 4 depicts two images 402 and 452 of the same striped object 320 positioned to provide changes in grey values in both x- and y-directions within the images 402 and 452. Accordingly, there are components present in both K1- and K2-directions within the frequency responses 406 and 456 as depicted in the frequency spaces 404 and 454 of the images 402 and 452, respectively.

As the striped object 320 moves, the frequency response changes, and the peaks within the frequency response move. For example, the position of the peaks 400, in the frequency response 406 are displaced from the peaks 400 in the frequency response 456. Specifically, the frequency response 406, to the object positioned at 45°, has peaks 400 that are generally displaced to the right of, and higher than, the peaks 400 in the frequency response 456, to the object positioned at 20°.

The position of the peaks 400 will move relatively as the striped object 320 changes direction, because when striped object 320 moves, the 2-D DFT responds more strongly to a different set of frequencies than the 2-D DFT responded to before the striped object 320 moved. In general, frequency is a measure of change in space or in time. Spatial frequencies of an image are the measure of the rate of change in grey level across an image. Such grey level changes are typically caused by edges. When the edges of the objects move, the frequency response of the image changes accordingly.

The same striped object 320, positioned four ways, in four images 302, 310, 402, and 452, generated four different frequency responses 302, 312, 406, and 456, respectively. The frequency response 302 of the image 300, wherein the stripes 326 are horizontal, is a vertical line 322. The frequency response 312 of the image 310, wherein the stripes 326 are vertical, is a horizontal line 324. The frequency response 406 of the image 402, wherein the stripes 326 are positioned at 45°, appeared on the frequency space 404 as two sets of parallel lines 408 and 410, one set of parallel lines 408 positioned at 45° and one set of parallel lines 410 positioned at 135°. The frequency response 456 of the image 452, wherein the stripes 326 are positioned at 20°, appeared on the frequency space 454 as two sets of somewhat parallel lines 458 and 460, one set 458 positioned at approximately 20° and one set 460 positioned at approximately 160°.

All the frequency responses 302, 312, 406, and 456 are related to the angle of the idealized object 320 and the angle of the striped features 326 in the images 300, 310, 402, and 452, respectively. More particularly, the lines, such as 322, 324, 408, 410, 458 and 460 (i.e., the spatial patterns), of the frequency responses 302, 312, 406, and 456 share, or are at a constant offset from, the angle of the idealized object 320 and/or the stripes 326. For instance, for the frequency response 406, the two sets of parallel lines 408 and 410 reflect the sides, and ends, of the stripes 326 (i.e. features), respectively. Therefore, the angle of the set of parallel lines 408 in the frequency space 404 is substantially equivalent to the angle of the width, w, of the stripes 326 in the image 402, and the angle of the set of parallel lines 410 in the frequency space 404 is substantially equivalent to the angle for the length, l, of the stripes 326 in the image.

The magnitude of the frequencies, and thus, that of the peaks 400 can be depicted in numerous manners, including by graphing the frequency response along a cross section of the frequency spaces 404 and 454, similarly to plots 306 and 316 of the horizontal and vertical idealized objects 320.

The invention recognizes that the magnitude of the frequency response, or portion thereof, of an image, contains a spatial pattern or patterns, and that the angle of the spatial pattern or patterns is related to, and often the equivalent of, the angle of the object in the image. The angle of the spatial pattern is related to the object by being at a constant offset from the angle of the object and/or features on the object.

FIGS. 3 and 4 each depict one instance of the frequency response, or portion thereof of the same idealized object 320 positioned at a given angle.

Figure 5A:
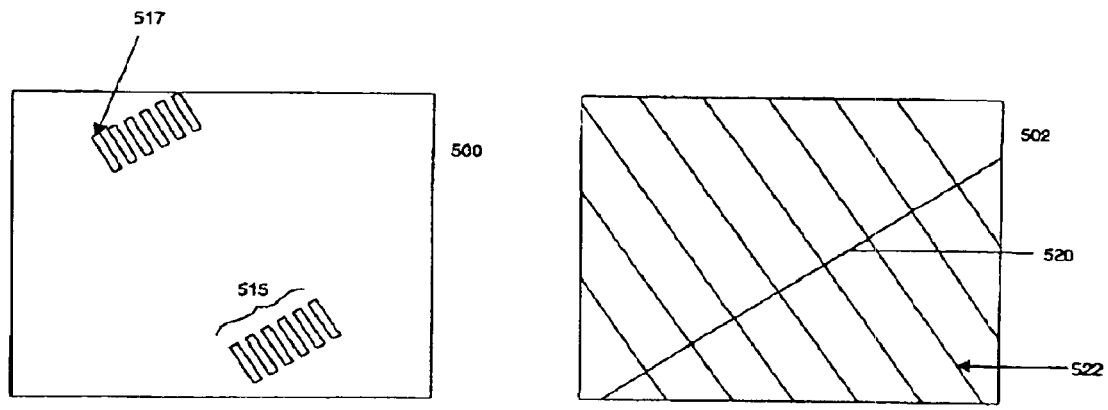
FIGS. 5A, 5B, 5C, 5D, 5E, and 5F depict images of objects and/or feature(s), not drawn to scale, and a representation of the absolute value of a frequency response, or portion thereof, of the objects and/or feature(s)

However, in manufacturing conditions, more than one instance of a frequency response to the same object is possible. This effect can be illustrated, in part, by FIGS. 5A and 5B, not drawn to scale, which depict two images 500 and 510 of a pair of lead sets, positioned within each image 500 and 510 at the same angle, and representations of the corresponding frequency responses 502 and 512. In image 510, each lead 516 has three regions, 524, 526, and 528. The presence of three regions is a typical effect caused by the specularly reflecting surface of the leads 516, where the specular reflections cause images of leads to display variations in brightness levels. Specular reflections from leads and the effects on images are well known in the art. For illustration purposes, the image 510 of the lead sets 514 is idealized so that each of the leads 516 is shown exhibiting the same three regions 524, 526, and 528. The second idealized image, image 500 of the lead sets 515 shows an image 500 that is not effected by specular reflection, so that each of the leads 517 images as one region. Although both images 500 and 510 are of two 6-leaded lead sets 514 and 515, positioned at the same angle, the frequency responses 502 and 512 are different. The frequency response 512 of the image 510, containing the specularly reflecting leads 516, is one set of parallel lines 518, while the frequency response 502, of the image 500, of the non-specularly reflecting leads 517, is a set of parallel lines 522 and a line 520 positioned orthogonal thereto.

Additionally, a spatial pattern within a frequency response can be due to factors other than the object or its features, such as the windowing of the image, where windowing is a term known in the art. For example, FIG. 5C depicts an image of a circuit board 530, not drawn to scale, and a representation of a corresponding frequency response, or portion thereof, 532. The frequency response 532 contains eight lines sharing four angles, two sets of parallel lines 534 and 536 are related to the angle of the features on the circuit board, and two other lines 538 and 540 are related to the windowing of the image 530. The lines 538 and 540 are part of two sets of parallel lines (not shown) sharing the angles of 0° and 90°. The other parallel lines had less intensity and were omitted for illustration purposes.

Further still, the frequency response can be a single line at each angle, as opposed to a set, or sets, of parallel lines. For instance, FIG. 5D illustrates an image 550 of a top view of a portion of an integrated circuit board, not drawn to scale, and a representation of the corresponding frequency response, or portion thereof 552. The integrated circuit board has several features, or portions thereof, aligned at approximately 30° and 120°. The frequency response 552 is two single lines 554 and 556, orthogonal to one another, as opposed to one or more sets of parallel lines. Returning to FIG. 3 previously described, the frequency responses 302 and 312 are other examples where the spatial pattern is a single line 322 and 324, respectively.

Figure 5B:
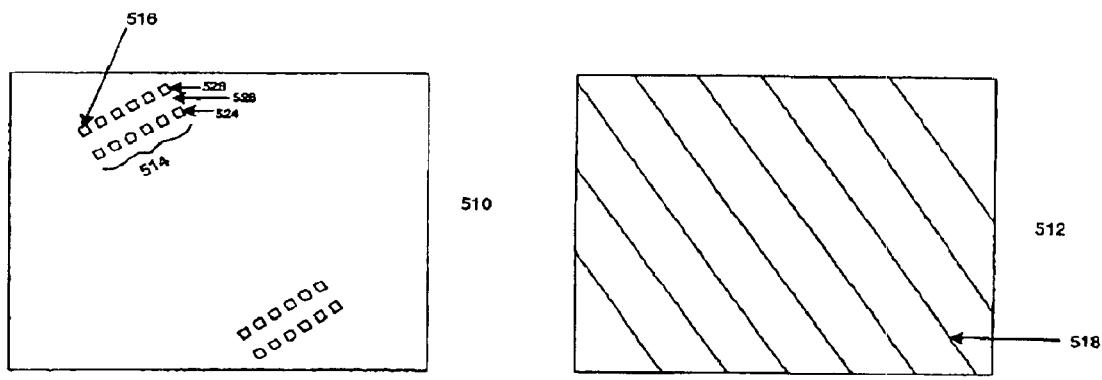
Figure 5C:
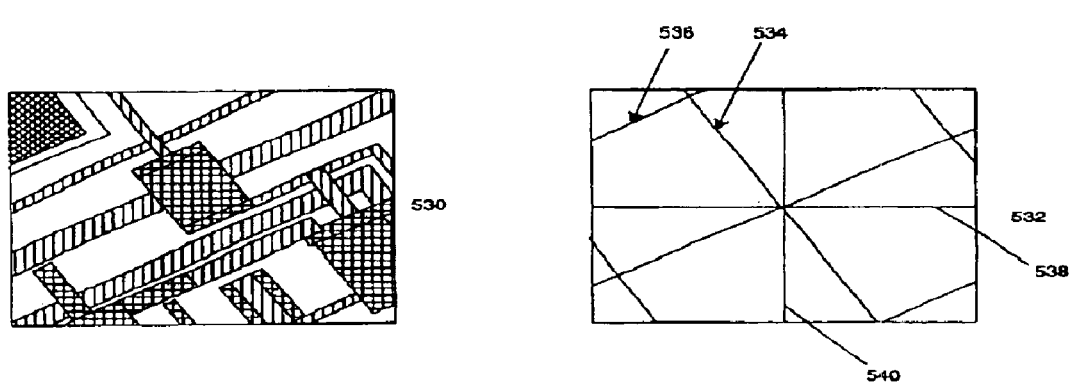
Figure 5D:
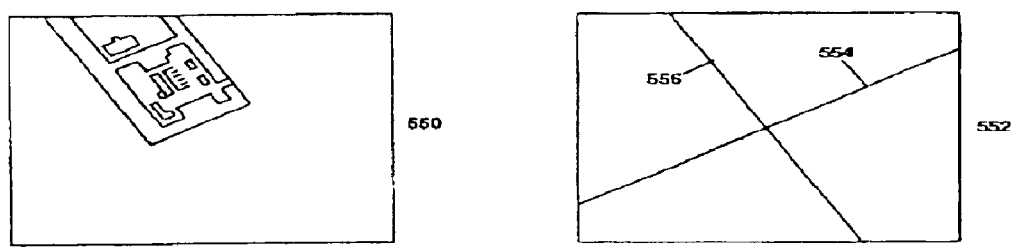
Figure 5E:
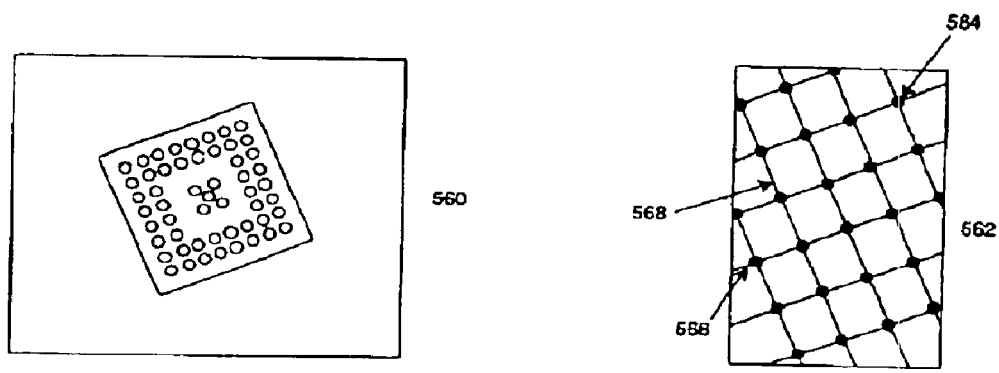
Figure 5F:
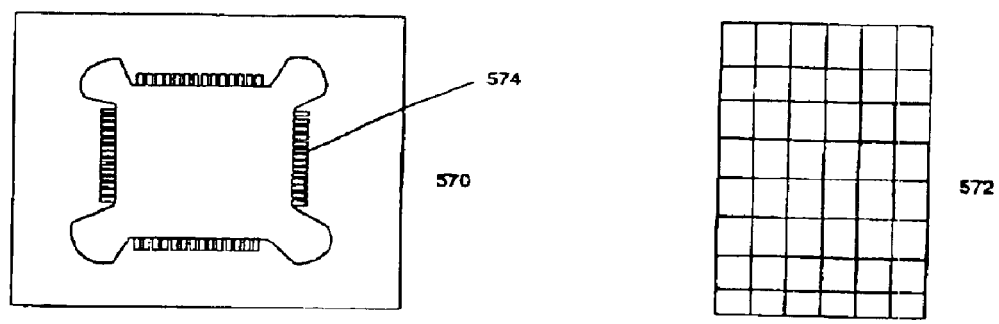

Another example of a frequency response is the discrete circles shown at the intersections of the lines in FIG. 5E, which depicts an image of a ball grid array and a representation of a corresponding frequency response, or portion thereof.

In one embodiment, to decrease processing requirements, only part of the frequency response is calculated and/or evaluated in step (204).

Also to decrease processing time, in a preferred embodiment, a two-dimensional discrete fast Fourier Transform of the image is computed, using techniques known in the art.

It should be apparent to those skilled in the art, that other discrete signal analysis techniques, such as z-transforms and cosine transforms, can be used in accordance with the teachings herein without departing from the scope of the invention. One skilled in the art, using the teachings herein, can easily verify which frequency analysis tools are useful, and the list given here is not inclusive.

Further, although the two-dimensional analysis described herein was in the x- and y-direction, other spatial representations can also be used, such as radial and circumference directions of r and $\Theta$ without departing from the scope of the invention.

Further still, the frequency analysis can be applied to more than two dimensions. For instance, a three-dimensional image signal (i.e. a signal that is a function of x, y, and z, for example) can be evaluated using the teachings herein, such as applying a three-dimensional discrete Fourier Transform. In this way, frequencies along the z-direction are examined. The three-dimensional image signal is constructed as known in the art; such as by building a three-dimensional object representation from two-dimensional slices of the object, for example.

Once the frequency response, or portion thereof, is generated, the spatial pattern within the frequency response, or portion thereof, is evaluated for the orientation information (204).

Returning to FIG. 4, for illustration purposes, the frequency response, or portion thereof 406 and 456, is represented graphically within a two-dimensional frequency space 404 and 454, respectively. The frequency spaces 404 and 454 contain plots of values of the frequency responses or grey-scale images representing the frequency responses 406 and 456, respectively.

When the frequency response is represented within an image, the frequency response is mapped to a grey-scale value in the image between 0 and 256. It is preferred that the grey values in the frequency image are mapped so that the low grey values represent low magnitudes in the frequency response and high grey values represent high magnitudes in the frequency response. It should be apparent that other mappings can be used, such as using the period, as opposed to the frequency, or mapping the high magnitudes using the low grey values, and the low magnitudes using the high grey values, for example. For illustration purposes, the figures used herein map the high magnitudes in the frequency response using the low grey values and the low magnitudes in the frequency response using the high grey values, so that the peaks of the frequencies 400 appear as darker features within the frequency images.

In a preferred embodiment, before the frequency space is evaluated, the stronger DC peak and other low frequency peaks, such as peak 422 on FIG. 4 or peak 320 on plot 316 of FIG. 3, within the frequency response, or portion thereof, are minimized and/or the higher frequencies are enhanced using a scaling factor. Preferably, the frequency response, $X(k1, k2)$, is scaled using a logarithmic function, such that the frequency image is mapped from the function $F(x,y)$, where $F(x, y) = \log |X(k1, k2)|$, and $X(k1, k2)$ as given above. The logarithmic function decreases the effect of the stronger DC peak and other low frequency peaks, and, thus, allows easier analysis of the smaller peaks. It should be apparent to one skilled in the art that other scaling functions can be used, such as raising X(k1, k2) to a fraction of a power, for example.

Optionally, the frequency response is filtered to minimize and/or remove extraneous data before the frequency response is evaluated. Frequency response 412 is an example of an instance of the frequency response 406 after being scaled and filtered, and frequency response 462 is an example of an instance of the frequency response 456 after being scaled and filtered. The filtering is accomplished by one of any number of vehicles known in the art. For instance, only the data points above a value threshold are retained for a plot or only data points above a grey value threshold are retained for an image. Alternatively, an edge operator is applied to a frequency space and the data points retained are only edges above a contrast threshold, or only "true peak" edges, for example, where edge operators and "true peaks" are terms and techniques known in the art.

The invention recognizes that a variety of algorithms can determine the angle of the spatial pattern(s) once the frequency response, or portion thereof, is represented two dimensionally in a frequency space, whether plotted or within a frequency image, for example, and the frequency response, or portion thereof, is preferably scaled and, optionally, filtered to enhance the high frequencies.

A variety of algorithms can analyze the frequency response, or portion thereof, to find the angle of the spatial pattern(s). For example, the angle of pattern(s) is found using projections. With this technique, the frequency image is projected at a plurality of angles to create a one-dimensional ("1-D") array for each of the angles, where 1-D projections are a technique known in the art, and further described in Cognex 300/400/500, Image Processing, Programmable Vision Engines, Revision 7.4 (1996) pp. 343–347. The 1-D arrays are evaluated for peaks, and the angle(s) of the projections producing higher peak(s) are the dominant angle(s) of the features in the image. For example, FIG. 4 depicts an instance of a 1-D array 426 formed from the projection of the frequency image 412 at 135°. Projecting the frequency image 412 at 135° produced high peaks, such as peaks 427. Thus, 135° is a dominant angle of the features (i.e., the lines) in the image 412. Also shown is an instance of a 1-D array 428 formed from the projection of the frequency image 462 at 160°. Projecting the frequency image 462 at 160° produced high peaks, such as peaks 429. Thus, 160° is a dominant angle of the features (i.e., the lines) in the frequency image 462. Those skilled in the art will appreciate that the peaks 427 and 429 represent portions of the 1-D array that exhibit a higher density of projected-grey levels relative to the background level thereof. Those skilled in the art will also realize that a different measure for the dominant angle could be used, such as the angle that produced the highest peak, the most high peaks, or other similar measure without departing from the scope of the invention.

Although empirically the patterns found have been lines or discrete circles, such as the discrete circles of FIG. 5E, other objects could generate other patterns within the frequency space. For such patterns, either the spatial pattern would need to be identified in order to choose the algorithm to evaluate it, or an algorithm that is not dependent on shape would be used, such as projection for certain objects.

An additional method for identifying lines, and the angle of the lines, from images has been described in commonly assigned, U.S. Pat. No. 6,075,881, incorporated herein by reference.

A still further method for identifying lines and the angle of the lines is applying a Hough-line finding algorithm. A Hough space for lines is a two-dimensional space in which lines from an image are recorded. The Hough space is adequately represented as a two-dimensional array of bins 446. One axis 442 represents the line-angle, a, and the other axis 444 represents the distance vector, d, which is the shortest distance from the origin of a coordinate system to the line. A point on a Hough space represents a line. Every data point from the frequency image "votes" into an accumulator array in the Hough space. The bins 446 with sufficiently many votes are identified as lines. For example the lines 414, 416, 418, and 420 are identified as peak bins 434, 436, 438, and 440, respectively, in a Hough space 432, and lines 464, 466, 468, and 470 are identified as peak bins, 474, 476, 478, and 480, respectively, in a Hough space 472. The bin with the most votes represents the strongest line.

Many other angle finding techniques can be used to find the angle of the spatial pattern without departing from the scope of the invention. Further still, if the frequency space is filtered before evaluation of the angle of the spatial pattern(s), the data points on the frequency space may be altered, such as binarized or represented by edges, for example. Therefore, the utility and efficiency of any particular angle finding technique may vary depending on the filtering technique used, and/or the representation of the frequency response in the frequency space, such as by grey level or scaled grey level, for example.

Often more than one spatial pattern is identified within the frequency response. In a preferred embodiment, the angle of all the spatial patterns are considered in subsequent processes. In another embodiment, the angle of the strongest pattern is used, such as the angle of the projection that produced the highest peak. In another embodiment, the spatial patterns are weighted, and a dominant pattern is determined from any combination of the strength, that is number of features along pattern, and/or the weighted value of the pattern. Weighting is accomplished using one of many methods known in the art, and aspects of the lines are weighted according to numerous schemes without departing from the scope of the invention. For instance, a simple weighting scheme is identifying as the dominant line, the line having a dominant frequency, after the frequency response has been logarithmically scaled to minimize the effect of the DC peak and other low frequency peaks. Alternatively, the lines are weighted based on density and/or length, for example.

The invention recognizes that a spatial pattern, specifically a line, within the frequency space has an angle in the frequency space that is equivalent to, or at a constant offset from, the angle of an object and/or features in the image.

Figure 9:
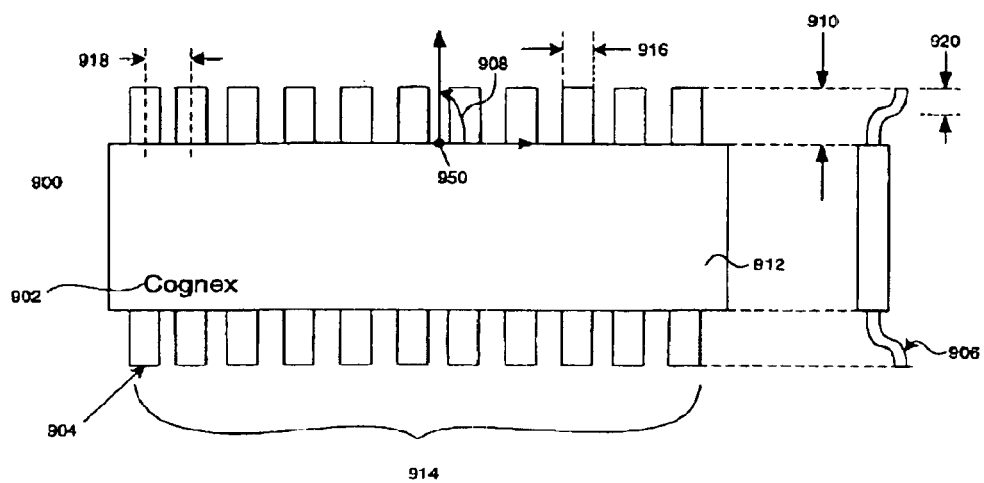

For example, the angle of at least one of the lines in the frequency space will equal the angle of the length of the leads of a leaded object, as can be seen by examining FIG. 5B, previously described herein. However, depending on how the angle of the leaded object is defined, the angle of the lines in the frequency space will be positioned 0° or 90° offset from the angle of the leaded object. For instance, if the angle of the leaded object is defined as angle 908 depicted in FIG. 9, the angle of the lines in the frequency space are offset 0° from the angle of the leaded object 900, and if the angle of the leaded object is defined as being along the horizontal axis, the angle of the lines in the frequency space are offset 90° from the angle of the leaded object.

Depending on the object or features, the angle does not indicate the direction of the object. For example, the angle, derived as herein described, for the lead sets of FIG. 5B, previously described, is 130° and 310°.

Figure 6:
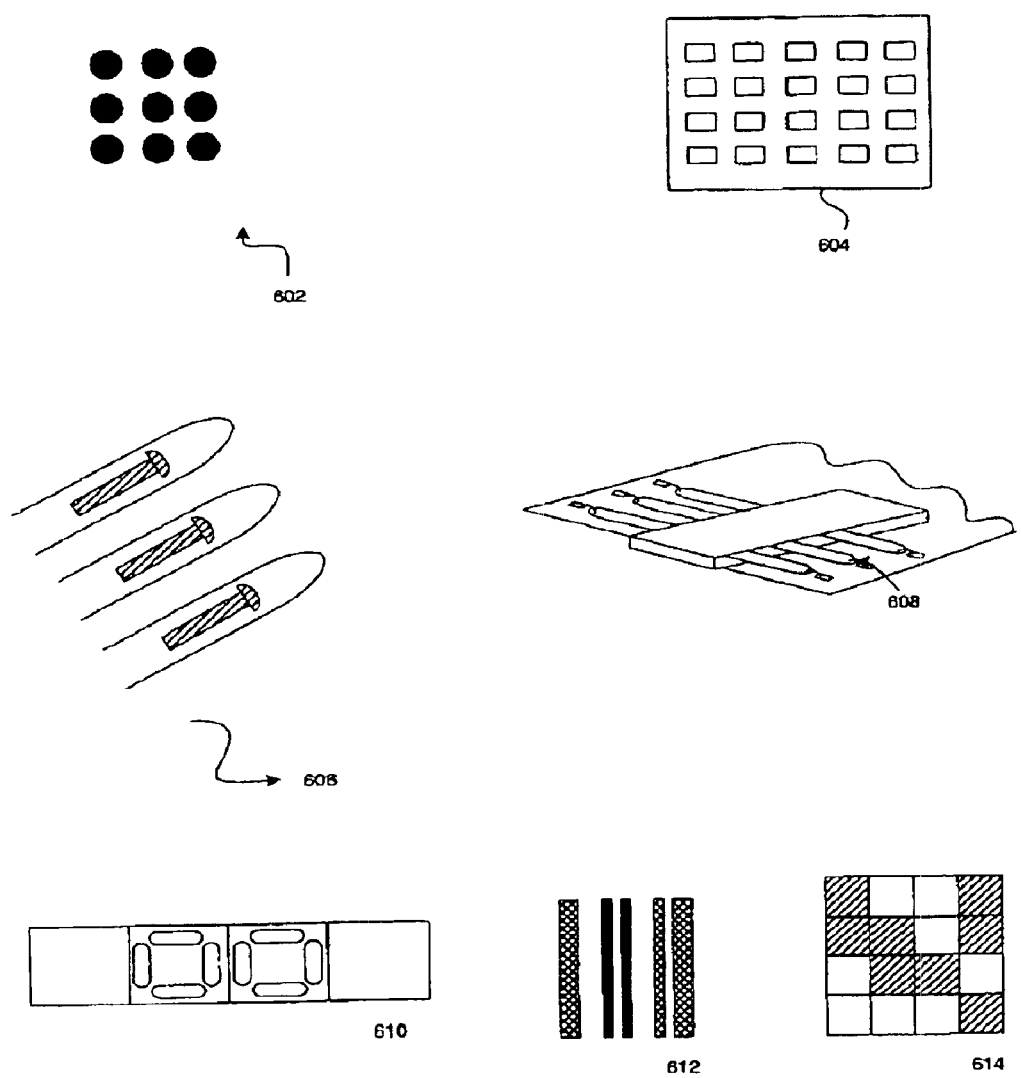
FIG. 6 depicts objects and features, not drawn to scale, whose angle can also be determined using the method of the invention.

Accurate and quick angle information is obtained particularly for objects that have features that repeat or for repeated objects positioned at the same angle, which is advantageous in many post-processing applications. Turning to FIG. 6, not drawn to scale, examples are certain calibration targets 602 with repeating features, pads on a circuit board 604, liquid crystal displays 610, a group of crescent bonds 606, a group of wires in a bonding application 608, two-dimensional ID codes 614, leaded objects, such as surface mount and through hole components, and ball grid arrays, for example.

Figure 7:
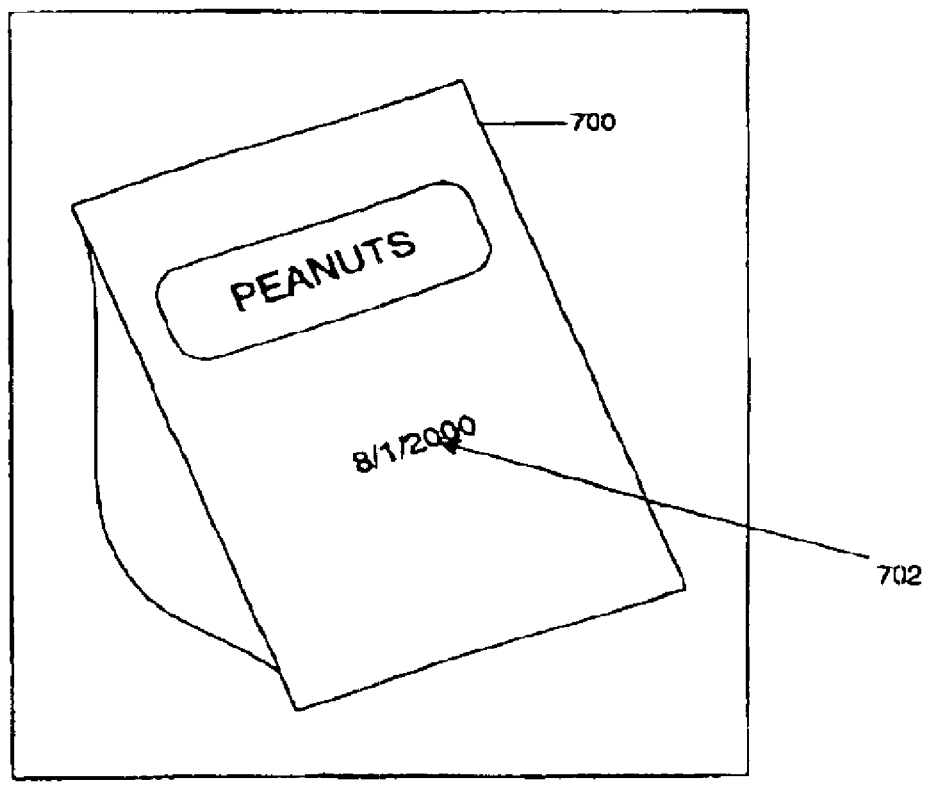
FIG. 7 depicts an image of object containing writing that can be evaluated using FIG. 2.

It should be apparent that angle of other objects without repeating features, are also amendable to being evaluated, such as a bar code 612, some of the calibration targets 602, or writing 702, shown in FIG. 7, described further hereinafter, for example. Another example is depicted in FIG. 5D, previously described which shows an integrated circuit board, having several features or portions thereof aligned at approximately 30° and 120°, not drawn to scale. The angle of approximately 30° and 120° is ascertained even though the features are not uniform or regularly spaced, as in the case of leads, and even though each feature does not contribute equally to the angle (some features contribute edges from both sides of the features, while others features contribute edges only from one side).

In general, many objects that have at least portions of the object and/or features oriented in a general direction can be analyzed using the method of FIG. 2.

Typically, determining the angle of the object in the image does not complete the image analysis. The angle, optionally, becomes input into subsequent image processing or analysis (206). It should be apparent that any type of post-processing can be implemented using the angle derived as described herein without departing from the scope of the invention. The angle can also be one of several desired outputs instead of, or in addition to, being input for further processing.

Knowing the angle of the features and/or object removes one variable from a vision task. Now, instead of performing a vision task where attention is paid to translation, rotation, and scale, only variations in translation and scale need to be accommodated. For instance, searches are often performed by making a model of the feature to be found, and searching the image at a plurality of angles and positions for a match of the model to a portion of the image. If scale is variable, this process is repeated at various scales. However, if the angle is predetermined, the search is executed more quickly because all possible angles of the model do not need to be examined. For example, if the vision task was character recognition of a freshness date 702 on an individual pack of peanuts 700 depicted in FIG. 7. The angle, computed as previously described, is 45° and/or 135°. Thereafter, the search model is not tested against the image at other angles, decreasing the search time, and improving time of performance of the character recognition.

It should be apparent that the angle information can be leveraged in any location, gauging, inspecting, training, or modeling procedure, for example. For instance, FIG. 10A and FIG. 10B are flowcharts summarizing operation of an embodiment of a method according to the invention that uses the angle(s), derived as previously described, to evaluate the image, where steps of the method are denoted in the detailed description in parentheses. In one embodiment depicted in FIG. 10A, the angle (1000) is leveraged to segment one or more regions of interest from the image (1002) by using a segmenting technique that uses, or is quicker given, the angle, where segmenting a region of interest of an image is a typical technique used during image processing. One example of a segmenting technique that uses, and/or is quicker given the angle is using projection along the angle, or at an offset thereto, to measure the extents of a region along that angle, or offset thereto. An additional example of a segmenting technique is given below. Thereafter, the regions of interest and/or the remainder of the image is evaluated (1004), where again the evaluation can include gauging, inspecting, training, or modeling, for example. Another embodiment is depicted in FIG. 10B. First, the angle is provided (1000). Then, one or more regions of interest are optionally segmented, with or without use of the angle (1006). Next, the regions of interest and/or the remainder of the image is evaluated by leveraging the angle (1008). Again, the evaluation is gauging, inspecting, training, or modeling, for example, where the evaluation requires, or is made more efficient, when provided, the angle of the object and/or features in the image.

Figure 8:
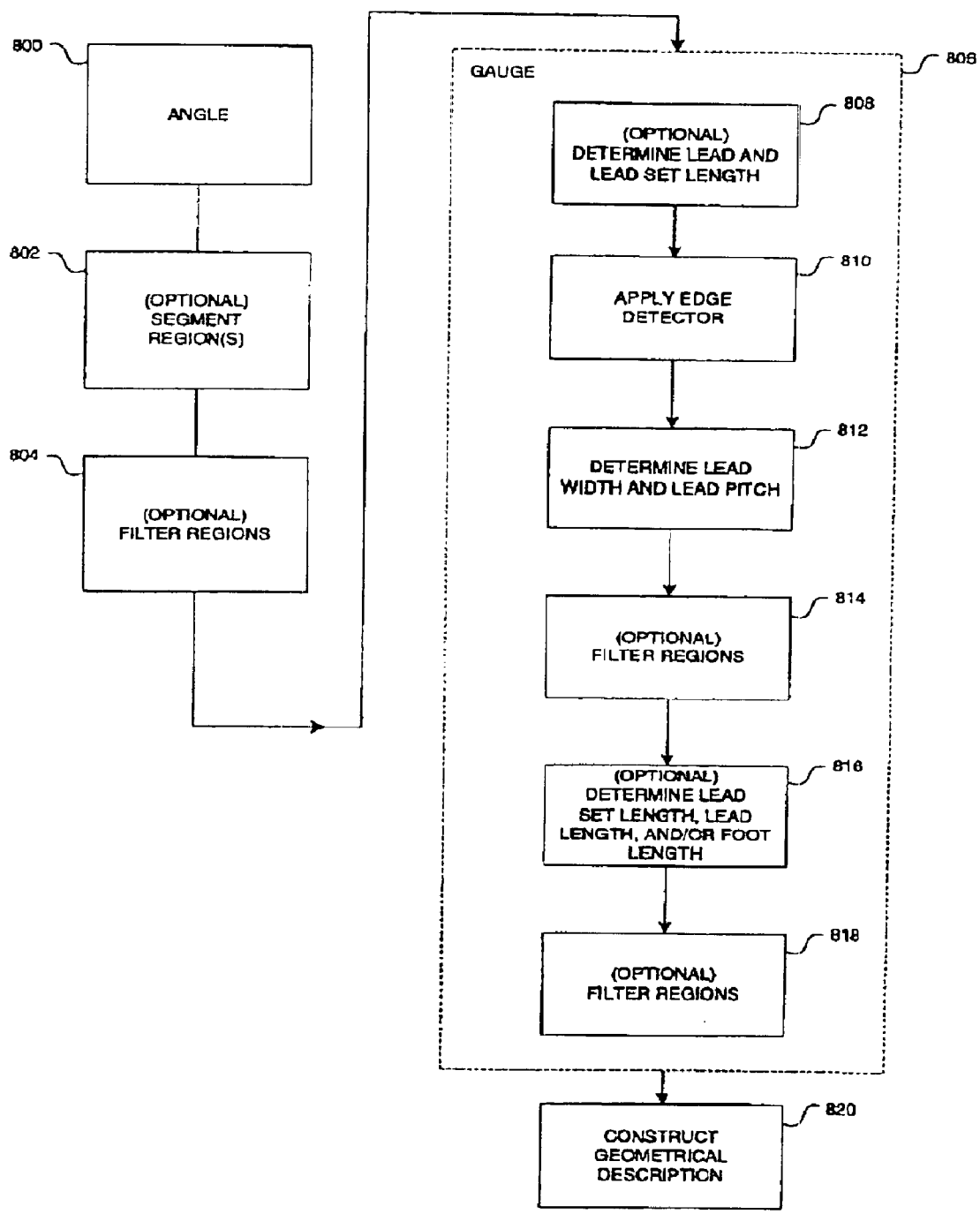
FIG. 8 is a flowchart summarizing operation of an embodiment of a method according to the invention that generates a model.

In a preferred embodiment, the angle is input (800) into a modeling procedure illustrated by the flowchart of FIG. 8, where steps of the method are denoted in the detailed description in parentheses. FIG. 8 describes a method that outputs a geometrical description of an object and/or features of an object given the angle of the feature and/or object, where the angle is derived as previously described.

The angle (800) is leveraged in the segmenting step (802), and/or the gauging portion (806) of the modeling task.

Numerous methods can be used to segment the regions of interest from the image, with, or without, using the angle. In one embodiment, the regions are segmented (802), without using the angle information, by determining a threshold grey value that separates the background from the regions of interest, which is a technique known in the art. As commonly understood by those trained in the art, determining a threshold to binarize the image is a difficult task in connectivity analysis. A threshold value that is too large will remove too much information from the image, and a threshold value that is too small will retain unwanted information.

Figure 9A:
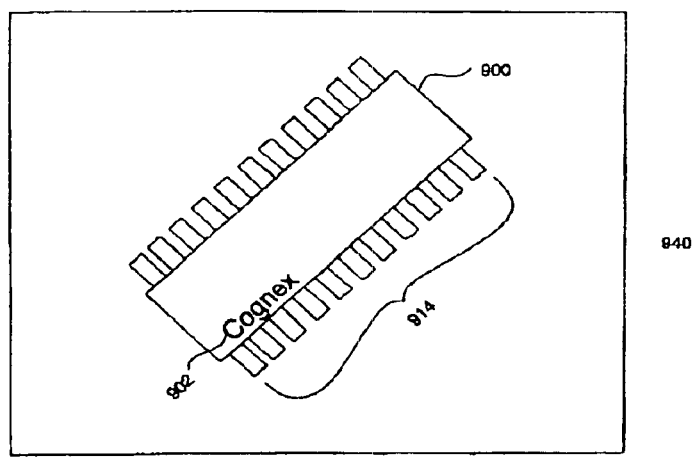

Therefore, one technique to segment a region, such as a lead set, chooses a threshold using an aspect of the regions, such as shape, in conjunction with an iterative process, as is further described in co-pending U.S. application Ser. No. 09/605,441 entitled, "Methods and Apparatuses for Generating from an Image a Model of an Object," filing date Aug. 28, 2000, which is hereby expressly incorporated by reference in its entirety. For example, the lead set region 914 of FIG. 9A is thresholded from image 940 in the iterative process by checking whether the region(s) segmented at a threshold value is rectangular. More particularly, pluralities of threshold values are tried, and the image 940 is binarized using each of the threshold values. The binary images are examined to determine whether one or more rectangular regions are present, where the shape is determined using tools known in the art, such as projection, for example. Different threshold values are tried until the binary image contains a substantially rectangular region or an even number of substantially rectangular regions.

An alternative way to segment the image is using U.S. Pat. No. 5,949,905 Nichani et al., assigned to Cognex Corporation, incorporated herein by reference.

A preferred embodiment, however, leverages the angle (800) to segment regions (802), and is described in co-pending U.S. application Ser. No. 09/457,825, entitled, "Methods and Apparatuses for Identifying Regions of Similar Texture in an Image," filing date Dec. 9, 1999, which is hereby expressly incorporated by reference in its entirety (the "Texture Patent Application"). In this embodiment, the Texture Patent Application applies a one-dimensional Fourier analysis only at the angles that were obtained in the previous step (800), as opposed to searching all possible angles. The regions having frequencies with substantially the highest power are segmented out of the image, as is described further in the Texture Patent Application.

For example, the angle 45° or 135°, derived as previously described, of the leaded object 900 in the image 940 is used in accordance with the teachings of the Texture Patent Application to segment the lead set 914.

When the Texture Patent Application segments (802) the lead set 914 from the image 940, other regions, such as the logo 902, may also be segmented. Therefore, optionally, extraneous regions are identified and ignored by a post-processing step, such as filtering after segmentation (804) or filtering after some (814), or all (818), of the gauging (806) is complete.

Specifically, regions or features therein having an aspect in conflict with a validity norm are identified and ignored or removed. For instance, ignoring all nonrectangular regions will remove from evaluation the region containing the logo 902, where the shape is determined using tools known in the art, such as a search tool using a synthetic model, for example. A further example ignores regions above an acceptable area threshold, given the magnification of the image 940, where the area is determined using numerous tools known in the art, such as a connectivity tool or a caliper tool, for instance.

The aspects of the regions, and/or features within the regions used to filter the regions depend on the object being modeled, and, therefore, vary with the application.

As previously described, in a preferred embodiment, the angles of any spatial pattern found in the frequency space ate input to the post processing step. In a preferred embodiment, the segmenting step indicates whether any of the angles derived as herein described were not the angles of the object and/or features (i.e., were incorrect angles). Specifically, no region is segmented using the incorrect angles or no region that passes the filters is segmented at the incorrect angles.

Next, the object and/or the features of the object are gauged (806), where gauging can be accomplished using various vision tools, and combinations thereof, tailored to the object and/or features, as should be apparent to those skilled in the art.

In the leaded object 900 example, each lead set region is gauged. FIG. 9B depicts a portion of a region 922 of the lead set 914. In one embodiment, the height 924 of the region 922 provides the lead length 910, and the length 926 of the region 922 provides the length of the lead set 914 (808).

The dimensions of the leads 904 are measured more accurately as distances between edges of the leads 904, where the edges are generated by applying an edge detector (810). From the edge data, the lead width 916, the lead pitch 918, (812) and, optionally, a refined value for the length of the lead set 914, a refined value for the lead length 910, and/or the foot length 920 (816) is determined. In one embodiment, edges corresponding to the sides of the leads 904, such as edge 932 and edge 936, for example, are found by accumulating edges along a projection axis, p, of a window 928, where the window 928 is shaded in FIG. 9B for illustration purposes.

The intensity of pixels within the window 928 along p are projected (i.e., added), thereby generating a one-dimensional image, which is illustrated graphically as histogram 930 of FIG. 9C. Linear projection collapses an image by summing the grey values of the pixels in the direction of the projection. The summation tends to amplify edges in the same direction as p. After projection, the one-dimensional image is filtered to remove smaller transitions in grey value.

The edge 932 is represented in the histogram 930 as a rising ramp 934, and the edge 936 is represented in the histogram 930 as a falling ramp 938. This functionality (i.e. identifying and filtering the edges) is typically provided in the industry as a single vision tool, usually known as a caliper tool. Each edge has a polarity (i.e., direction), where edge 932 has a dark-to-light polarity, also known as a positive polarity, and edge 936 has a light-to-dark polarity, also known as a negative polarity.

For the lead set 914, FIG. 9D depicts a partial edge list 944 containing the first seven edges of the histogram 930. The edges are labeled from 0 through 6 according to the position of the edge from the left to right across the region 922, such that edge 0 is positioned closest to the beginning of the window 928 and edge 6 edge is the farthest away of the edges within the partial edge list 944. The edges are also labeled with the respective polarity by a plus or minus notation placed below the ordinal label.

The location of the regions and the angle of the features and/or object, derived as previously described, provide the necessary information to properly place the window 928. The width and height of the window 928 are determined using the area of the region 922.

Alternatively, a connectivity analysis, a technique known in the art, segments the region 922, and the width and the height of the window 928 is determined therefrom, and, in conjunction with the previously determined angle, the position of the window 928 is determined therefrom.

Once the edges are generated (810), the lead width 916 and the lead pitch 918 is determined (812) using a gauging technique, such as by finding the distance between parallel edges, which is a technique known in the art.

In one embodiment, the lead width 916 and the lead pitch 918 are found by pairing, based on polarity, the edges within the edge list 944, so that the edge pairs represent the sides of each lead 904, and then determining therefrom the lead width 912 and the lead pitch 914 (812).

The invention recognizes that pairing using the only known, (i.e., the polarity) will correlate enough of the edges with the proper lead side to determine a representative lead width and lead pitch.

The polarity constraint is dictated by the lighting of the object during imaging. For front lighting, the leads 904 image as bright features, and, therefore, an edge pair corresponding to the first lead 946 in the lead set 914 is a positive edge that is followed in the edge list 944 by a negative edge of a higher label number. A higher label number indicates the position of the second edge is to the right of the first edge in the edge pair, (i.e. the edges are paired going in the direction from left to right across the region 922 and the histogram 930). Therefore, the edge pair of the first lead 946, using the polarity constraint, is 0+ and 1−. The edge pair corresponding to the second lead 948 is composed of edges with higher labels than the edge of the first lead 946, and the edge pair includes a positive edge that is followed in the edge list 944 by a negative edge of a higher label number (i.e. 3+ and 4−). The edge list 944 is traversed in this manner, from 0 to the last label (not shown) pairing all possible edges meeting the polarity constraints described above. Edges that are not paired, such as edge 2−, are, optionally, discarded.

Then, the median width and the median pitch are determined from the positions of the edges in the edge pairs.

Preferably, the median width and the median pitch are refined using a second set of edge pairs that are generated by re-traversing the edge list 944, which may include the discarded edges, such as edge 2−, and re-pairing the edges using all the known values, where the known values now include: the polarity, the median width, and the median pitch. The constraints to pair edges now include both polarity and distance. An edge pair corresponding to the first lead 946 is a positive edge followed in the edge list 944 by a negative edge that is positioned at a distance, equal to, or greater than, the median lead width, plus or minus a tolerance, and has a higher label number, where the value of the tolerance will depend upon the application. In this example, edge 1− is not within the tolerance of the median lead width distance from edge 0+. Therefore, the edge pair of the first lead 946 is 0+ and 2−. The first edge of the second lead 948 is again a positive edge, and it is positioned at a distance, equal to, or greater than, the median lead pitch, plus or minus the tolerance, from the edge 0+. In this example, the first edge of the second lead 948 is edge 3+. The second edge of the second lead 948 is again a negative edge, and it is positioned at a distance, equal to, or greater than, the median lead pitch, plus or minus the tolerance, from the edge 2− (i.e., 4−). Alternatively, the second edge of the second lead 948 is again a negative edge, and it is positioned at a distance, equal to, or greater than, the median lead width, plus or minus the tolerance, from the edge 3+(i.e., 4−). The edge list 944 is traversed in this manner from 0 to the last label (not shown) pairing all possible edges meeting the polarity and distance constraints described above.

Thereafter, the median widths and pitches are recomputed using the refined set of edge pairs.

For back-lit images, the polarity constraints are reversed, where the term front lit and back-lit images are known in the art.

The technique described to associate the proper edge with a lead side can be used to associate edges with other boundaries without departing from the scope of the invention, such as associated edges with bar codes for instance. It should also be apparent that when the lighting is known (i.e., the polarity is known) the above technique can be used to differentiate between edges of a feature of interest and extraneous edges, whether the extraneous edges, for example, are due to noise or due to features not of interest, including differentiating edges from images of ball grid arrays, images of keys in key chains, and images of numerical key pads on phones or remote controls, for example.

Optionally, the lead set length is refined (816) as the distance between the first edge 932 of the first lead 946 and the second edge 952 of the last lead 954.

Optionally, the foot length 920 is determined (816) from front-lit images, assuming that the foot is a single bright region, such as region 528 within FIG. 5B described previously, for example. A window 942, shaded for illustration purposes, is positioned, across one or more leads 904, and generally orthogonal to window 928. The grey values within the window 942 are projected along the projection axis, $p_2$, to identify possible edges. The two edges that surrounding a bright region, that is a positive edge followed by a negative edge going in the up to down direction, and the two edges that are the furthest from the lead body are the edges of the foot 906, which once identified provide the foot length 920. Optionally, the edges of more than one foot for more than one lead 904 can be used to find the median foot length.

Further, when the window 942 crosses the ends of the leads 904, optionally, the lead length 920 is also refined (816) from the edges found therein.

Next, the geometrical description is constructed (820). In addition to the gauged dimensions, the geometrical description often requires additional values that may be derived from the gauged dimensional information. In the lead set example, the geometrical description also includes the number of leads within the lead set, where the number of leads 904 within the lead set 914 equals the distance between the first lead 946 and the last lead 954 divided by the lead pitch 918 plus one. The distance between the first lead 946 and the last lead 954 is the length 926 of the region 922 or the position of the last edge 952 minus the position of the first edge 932. Alternatively, the number of leads 904 equals the number of passing paired edges. The lead length 910, the lead width 916, the lead pitch 918, the number of leads, and/or foot length 920 comprise part, or all, of a typical geometric description (820) of the lead set 914, which is used as a model. Additionally, the location 950 and angle 908 comprise, part or all, of the pose of the lead set 914 in the geometrical description. Further, the angle is, optionally, used to generate a complete description of a leaded object by properly combining at the angle of the lead set and the angle of the object the geometrical description of more than one lead set of a single leaded object.

The model is used in vision tasks as is, or refined further. Once the geometrical description is determined, optionally, features of the object are re-gauged to refine the dimensions. It should be apparent vision tools known in the art alone or in combination, can refine part, or all, of the geometrical description once it has been determined as herein described. The lead length and foot length are rougher than the other measurements, and are easily refined using calipers. In a preferred embodiment, the geometrical description is refined as described in co-pending patent application entitled "Methods and Apparatuses for Refining a Geometric Description of an Object Having a Plurality of Extensions", application Ser. No. 09/203,182, filed Nov. 30, 1998, assigned to Cognex Corporation.

It should be apparent that other more sophisticated tools, available in the art, can be used to further process and/or score edges, known in the art, according to the specificity required by the application.

It should also be apparent that the gauging description and construction of the geometrical description detailed above is an instance of gauging and modeling a gullwing lead set, and refinements thereto, or refinements to adapt the gauging and/or construction of the geometrical description to other objects and/or regions can be made without departing from the scope of the invention.

Figure 11:
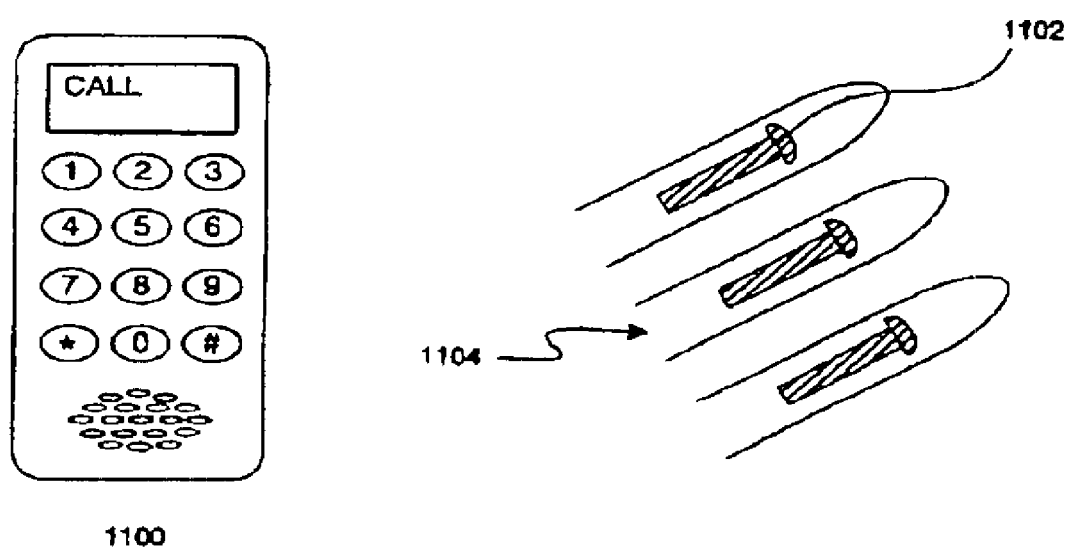
FIG. 11 depicts features and objects, not drawn to scale, that can be modeled using the method of the invention

It should also be apparent that other objects can be modeled, such as a telephone display 1100, or an averaged or representative crescent bond 1102 from among the group of crescent bonds 1104 depicted in FIG. 11, not drawn to scale. Also, many of the objects for which the angle can be found, as described herein, can also be usefully modeled, including but not limited to pads, ball grid arrays, and calibration targets, for example.

Further, any image processing algorithm that uses synthetic models can use a model generated using the teachings herein once the segmenting, gauging, and/or constructing aspect of the modeling is tailored to the application.

Those skilled in the art will appreciate that some, or all, of the steps of generating a frequency response, finding angles, post-processing, segmenting, filtering, and gauging described hereinbefore can be combined and effected as hardware implementations, software implementations, or a combination thereof.

Furthermore, it should be appreciated that any of the images described herein can be subject to further processing, such as by filtering using a gaussian filter, median filter, smoothing filter, morphological filter or the like known in the art, in order to improve image quality.

Although connectivity tools and caliper tools are described herein for obtaining characteristics relating to the length, width, pitch, and area of the leads, lead sets, and/or feet of the leads for the model generation, it should be appreciated that the information relating to the characteristics of the features or object can be obtained using other vision tools known in the art or from a CAD tool or other machinery that requires or acquires and has information relating to the characteristics of interest. Alternatively, portions of the information can be manually obtained by an operator, entered into the system, and used in instead of, or as a starting value for, the characteristics.

It should be apparent that the output of the application of the frequency analysis can be stored, or represented as is, or by using formats other than a frequency image without departing from the scope of the invention, such as parametric representations to save space, for example.

It should also be apparent to those skilled in the art that the order of the model generation can be altered without departing from the scope of the invention.

Those skilled in the art will also realize that using reduced-resolution images upon which to apply the frequency analysis, evaluate the angle, find and/or evaluate the regions, or gauge, the image or regions, could decrease processing time. Further, any combination of full-resolution and reduced-resolution images can be used. However, use of reduced-resolution images typically results in a loss of accuracy.

Those skilled in the art will realize that processing time can also be decreased by performing any of the computations described herein using sampled data, such as finding angle from sampled data, for example, perhaps at the expense of performance. Sampled data is a subset of the available data points, such as every third data point, for instance.

Those skilled in the art will realize that the frequency analysis can be used to detect movement over time or changes in angle of features over process steps.

Those skilled in the art will realize that the image can be of an entire object, part of one object, or part of multiple objects.

Although the invention has been shown and described with respect to exemplary embodiments thereof, various other changes, omissions, and additions in the form of, and detail thereof, may be made therein without departing from the spirit and scope of the invention as claimed. Accordingly, the above description is not intended to limit the invention except as indicated in the following claims.

What is claimed is:

1. A method for determining an orientation of an object, the method comprising:

acquiring an intensity image of the object;

generating at least a portion of a two-dimensional frequency response of the intensity image;

representing the at least a portion of a two-dimensional frequency response within a frequency space, the at least a portion of a frequency response providing features arranged in a spatial-frequency pattern within the frequency space; and finding an angle of the spatial-frequency pattern within the frequency space, wherein the angle provides the orientation of the object.

2. The method of claim 1, wherein the intensity image is of a portion of the object.

3. The method of claim 1, wherein generating further includes:

generating the at least a portion of a two-dimensional frequency response of the intensity image by applying a frequency analysis tool to the intensity image.

4. The method of claim 3, wherein generating the at least a portion of a two-dimensional frequency response of the intensity image includes:

generating at least a portion of a magnitude of a two-dimensional discrete Fourier transform of the intensity image to provide the at last a portion of a two-dimensional frequency response.

5. The method of claim 4, wherein the two-dimensional discrete Fourier transform includes a two-dimensional discrete fast Fourier transform.

6. The method of claim 3, wherein generating the at least a portion of a two-dimensional frequency response of the intensity image includes:

generating at least a portion of a two-dimensional discrete cosine-transform of the intensity image to provide the at least a portion of a two-dimensional frequency response.

7. The method of claim 3, wherein generating the at least a portion of a two-dimensional frequency response of the intensity image includes:

generating at least a portion of a two-dimensional discrete sine-transform of the intensity image to provide the at least a portion of a two-dimensional frequency response.

8. The method of claim 3, wherein generating the at least a portion of a two-dimensional frequency response of the intensity image includes:

generating at least a portion of a two-dimensional z-transform of the intensity image to provide the at least a portion of a two-dimensional frequency response.

9. The method of claim 1, wherein representing further includes:

representing the at least a portion of a two-dimensional frequency response as a logarithmically scaled frequency response within the frequency space.

10. The method of claim 1, wherein the frequency space is a frequency image, and wherein representing the at least a portion of a two-dimensional frequency response further includes:

scaling the at least a portion of a two-dimensional frequency response using a scaling function so as to enhance high frequency responses within the at least a portion of the two-dimensional frequency response to provide a scaled frequency response; and mapping the scaled response by gray scale on the frequency image.

11. The method of claim 1, wherein finding further includes:

identifying the spatial-frequency pattern within the frequency space; and finding the angle of the spatial-frequency pattern.

12. The method of claim 1, wherein the features form a plurality of spatial-frequency patterns within the frequency space, and wherein finding further includes:

finding the angle of the plurality of spatial-frequency patterns.

13. The method of claim 1, wherein the features form a plurality of spatial-frequency patterns within the frequency space, and wherein finding further includes:

identifying one dominant spatial-frequency pattern from among the plurality of spatial-frequency patterns; and finding the angle of the dominant spatial-frequency pattern.

14. The method of claim 13, wherein identifying further includes:

identifying as the one dominant spatial-frequency pattern one spatial-frequency pattern of the plurality of spatial-frequency patterns that includes a greatest number of the features.

15. The method of claim 1, wherein the orientation of the object is at a constant offset from the orientation of the spatial-frequency pattern.

16. The method of claim 15, wherein the constant offset substantially equals zero.

17. The method of claim 15, wherein the orientation of the object is defined by the angle of an object feature on the object.

18. The method of claim 1, wherein the spatial-frequency pattern includes a line, the line having a line angle, the angle having a constant offset from the line angle.

19. The method of claim 18, wherein the object is a leaded object having leads, and wherein the orientation of the leaded object is defined by the angle of one of the leads.

20. The method of claim 18, wherein the angle substantially equals an orientation angle of a surface mount object from an axis of the intensity image.

21. The method of claim 1, farther comprising:

inputting the orientation of the object into a subsequent image processing algorithm.

22. The method of claim 1, wherein finding the angle of the spatial-frequency pattern further includes:

processing the frequency space as a second image to find the angle of the spatial-frequency pattern therein.

23. The method of claim 1, wherein representing the at least a portion of a two-dimensional frequency response further includes:

interpreting the features of the at least a portion of a two-dimensional frequency response within the frequency space as image features in a second intensity image.

24. The method of claim 1, wherein finding the angle of the spatial-frequency pattern further includes:

conducting a pattern analysis on the features.

25. The method of claim 1, wherein the features in the frequency space are formed from uv data and finding the angle further includes:

interpreting the uv data as a second intensity image to find the angle of the spatial-frequency pattern therein.

26. A method for determining an orientation of an object, the method comprising:

acquiring an intensity image of the object;

generating at least a portion of at least a two-dimensional frequency response of the intensity image, frequencies within the at least a portion of at least a two-dimensional frequency response forming a spatial-frequency pattern; and finding an angle of the spatial-frequency pattern, wherein the angle provides the orientation of the object.

27. The method of claim 26, wherein generating further includes:

representing the frequencies within the at least portion of at least a two-dimensional frequency response within a frequency space, features within the frequency space forming the spatial-frequency pattern.

28. The method of claim 27, wherein the frequency space is a frequency image, and wherein representing the at least a portion of at least a two-dimensional frequency response further includes:

scaling the at least a portion of at least a two-dimensional frequency response using a scaling function so as to enhance high frequency responses within the at least a portion of at least the two-dimensional frequency response to provide a scaled frequency response; and mapping the scaled frequency response by gray scale on the frequency image.

29. The method of claim 27, wherein the orientation of the object in the intensity image is at a constant offset from the angle of the spatial-frequency pattern in the frequency space.

30. The method of claim 29, wherein the orientation of the object is defined by the angle of a feature on the object.

31. The method of claim 26, wherein generating further includes:

generating the at least a portion of at least a two-dimensional frequency response of the intensity image by applying a frequency analysis tool to the intensity image.

32. The method of claim 31, wherein generating the at least a portion of at least a two-dimensional frequency response of the intensity image includes:

generating at least a portion of a magnitude of at least a two-dimensional discrete Fourier transform of the intensity image to provide the at least a portion of at least a two-dimensional frequency response.

33. The method of claim 26, further comprising:

acquiring a plurality of intensity images of the object at different depths within the object; and generating a three-dimensional image containing a three-dimensional intensity representation of the object using the plurality of intensity images of the object;

wherein generating the at least a portion of at least a two-dimensional frequency response of the intensity image further includes:

generating at least a portion of a three-dimensional frequency response by applying a frequency analysis tool to the three-dimensional image.

34. The method of claim 26, wherein the spatial-frequency pattern includes a line, the line having a line angle, the angle having a constant offset from the line angle.

35. The method of claim 26, wherein finding the angle further includes:

representing the spatial-frequency pattern in a frequency space; and processing the frequency space as a second intensity image to find the angle of the spatial-frequency pattern therein.

36. An apparatus for determining an orientation of an object within an intensity image, the apparatus comprising:

frequency means adapted to generate at least a portion of at least a two-dimensional frequency response of the intensity image;

a frequency space adapted to receive the at least a portion of at least a two-dimensional frequency response, the at least a portion of a frequency response providing features arranged in a spatial-frequency pattern within the frequency space; and finding means adapted to find an angle of the spatial-frequency pattern within the frequency space, wherein the angle provides the orientation of the object.

37. The apparatus of claim 36, wherein the frequency means is further adapted to generate the at least a portion of at least a two-dimensional frequency response of the intensity image by applying a frequency analysis tool to the intensity image.

38. The apparatus of claim 37, wherein the frequency means is further adapted to generate at least a portion of a magnitude of at least a two-dimensional discrete Fourier transform of the intensity image to provide the at least a portion of at least a two-dimensional frequency response.

39. The apparatus of claim 36, wherein the frequency space is a frequency image, the apparatus further comprising:
   scaling means, adapted to scale the at least a portion of at least a two-dimensional frequency response on the frequency space using a scaling function so as to enhance high frequency responses within the at least a portion of the two-dimensional frequency response and to provide a scaled frequency response; and
   mapping means, in cooperation with the scaling means, adapted to map the scaled frequency response by grey scale on the frequency image.

40. The apparatus of claim 36, wherein the orientation of the object in the intensity image is at a constant offset from the angle of the spatial-frequency pattern in the frequency space.

41. The apparatus of claim 40, wherein the orientation of the object is defined by the angle of a feature on the object.

42. The apparatus of claim 36, wherein the spatial-frequency pattern includes a line, the line having a line angle, the angle having a constant offset from the line angle.

43. The apparatus of claim 36, wherein the finding means is further adapted to processes the frequency space as a second intensity image to find the angle of the spatial-frequency pattern.

44. The apparatus of claim 36, wherein the features within the frequency space are image features of a second intensity image.

45. The apparatus of claim 36, wherein the finding means is further adapted to conduct a pattern analysis on the features.

46. A method for finding an orientation of an object, the method comprising:
   acquiring an intensity image of the object;
   applying a frequency analysis tool to the intensity image to produce at least a portion of a two-dimensional frequency response of the intensity image;
   representing the at least a portion of a two-dimensional frequency response within a frequency space, the at least a portion of a frequency response providing features arranged in spatial-frequency pattern within the frequency space; and
   determining an angle of the spatial-frequency pattern wherein the angle provides the orientation of the object.

47. The method of claim 46, wherein applying the frequency analysis tool includes:
   generating at least a portion of a magnitude of a two-dimensional discrete Fourier transform of the intensity image to provide the at least a portion of a two-dimensional frequency response.

48. The method of claim 46, wherein the frequency space is a frequency image, and wherein representing the at least a portion of a two-dimensional frequency response further includes:
   scaling the at least a portion of a two-dimensional frequency response using a scaling function so as to enhance high frequency responses within the at least a portion of the two-dimensional frequency response to provide a scaled frequency response; and
   mapping the scaled response by gray scale on the frequency image.

49. The method of claim 46, wherein the orientation of the object in the intensity image is at a constant offset from the angle of the spatial-frequency pattern in the frequency space.

50. The method of claim 49, wherein the orientation of the object is defined by the angle of a feature on the object.

51. The method of claim 46, wherein the spatial-frequency pattern includes a line, the line having a line angle, the angle having a constant offset from the line angle.

52. The method of claim 46, wherein representing the at least a portion of a two-dimensional frequency response further includes:
   interpreting the features of the at least a portion of a two-dimensional frequency response within the frequency space as image features in a second intensity image.

53. The method of claim 46, wherein determining the angle of the spatial-frequency pattern further includes:
   conducting a pattern analysis on the features.

* * * * *